United States Patent
Carmel et al.

(10) Patent No.: US 7,676,356 B2
(45) Date of Patent: *Mar. 9, 2010

(54) SYSTEM, METHOD AND DATA STRUCTURE FOR SIMULATED INTERACTION WITH GRAPHICAL OBJECTS

(75) Inventors: Ron Carmel, San Francisco, CA (US); Hugo J. C. DesRosiers, Berkeley, CA (US); Daniel Gomez, Fremont, CA (US); James F. Kramer, Redwood City, CA (US); Jerry Tian, Sunnyvale, CA (US); Marc Tremblay, Cambridge, MA (US); Christopher J. Ullrich, San Francisco, CA (US)

(73) Assignee: Immersion Corporation, San Jose, CA (US)

( * ) Notice: Subject to any disclaimer, the term of this patent is extended or adjusted under 35 U.S.C. 154(b) by 181 days.

This patent is subject to a terminal disclaimer.

(21) Appl. No.: 11/264,743

(22) Filed: Oct. 31, 2005

(65) Prior Publication Data

US 2006/0122819 A1  Jun. 8, 2006

Related U.S. Application Data

(63) Continuation of application No. 09/675,811, filed on Sep. 29, 2000, now Pat. No. 7,050,955.

(60) Provisional application No. 60/157,272, filed on Oct. 1, 1999.

(51) Int. Cl.
*G06F 9/44* (2006.01)
(52) U.S. Cl. ............................................. 703/21; 703/6
(58) Field of Classification Search .................. 345/420, 345/440; 703/2, 6, 21
See application file for complete search history.

(56) References Cited

U.S. PATENT DOCUMENTS

| 2,972,140 A | 2/1961 | Hirsch |
| 3,157,853 A | 11/1964 | Hirsch |
| 3,220,121 A | 11/1965 | Cutler |
| 3,497,668 A | 2/1970 | Hirsch |
| 3,517,446 A | 6/1970 | Corlyon et al. |
| 3,623,064 A | 11/1971 | Kagan |
| 3,902,687 A | 9/1975 | Hightower |
| 3,903,614 A | 9/1975 | Diamond et al. |

(Continued)

FOREIGN PATENT DOCUMENTS

| EP | 0 349 086 A1 | 1/1990 |
| JP | H2-185278 | 7/1990 |
| JP | H4-8381 | 1/1992 |
| JP | H5-192449 | 8/1993 |
| JP | H7-24147 | 1/1995 |

OTHER PUBLICATIONS

"Haptic Rendering: Programming Touch Interaction With Virtual Objects", Salisbury et al, 1995 Symposium on Interactive 3D Graphics, pp. 123-130, 1995 ACM.*

M.R. Tremblay et al., "Whole-Hand Interaction with 3D Environments", Nov. 5, 1998, Workshop on Perceptual User Interfaces, four unnumbered pages.*

(Continued)

*Primary Examiner*—Paul L Rodriguez
*Assistant Examiner*—Russ Guill
(74) *Attorney, Agent, or Firm*—Kilpatrick Stockton LLP

(57) ABSTRACT

Object simulation and interaction of and between computer-generated or graphical objects in a virtual space includes neutral scene graphs, data structures and procedures for using such graphs and data structures.

20 Claims, 6 Drawing Sheets

U.S. PATENT DOCUMENTS

| | | |
|---|---|---|
| 3,911,416 A | 10/1975 | Feder |
| 4,127,752 A | 11/1978 | Lowthorp |
| 4,160,508 A | 7/1979 | Salisbury, Jr. |
| 4,236,325 A | 12/1980 | Hall et al. |
| 4,262,549 A | 4/1981 | Schwellenbach |
| 4,333,070 A | 6/1982 | Barnes |
| 4,464,117 A | 8/1984 | Foerst |
| 4,484,191 A | 11/1984 | Vavra |
| 4,513,235 A | 4/1985 | Acklam et al. |
| 4,581,491 A | 4/1986 | Boothroyd |
| 4,599,070 A | 7/1986 | Hladky et al. |
| 4,708,656 A | 11/1987 | de Vries et al. |
| 4,713,007 A | 12/1987 | Alban |
| 4,794,392 A | 12/1988 | Selinko |
| 4,885,565 A | 12/1989 | Embach |
| 4,891,764 A | 1/1990 | McIntosh |
| 4,930,770 A | 6/1990 | Baker |
| 4,934,694 A | 6/1990 | McIntosh |
| 4,935,728 A | 6/1990 | Kley |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin et al. |
| 5,038,089 A | 8/1991 | Szakaly |
| 5,078,152 A | 1/1992 | Bond et al. |
| 5,165,897 A | 11/1992 | Johnson |
| 5,175,459 A | 12/1992 | Danial et al. |
| 5,186,695 A | 2/1993 | Mangseth et al. |
| 5,195,179 A | 3/1993 | Tokunaga |
| 5,212,473 A | 5/1993 | Louis |
| 5,240,417 A | 8/1993 | Smithson et al. |
| 5,264,836 A | 11/1993 | Rubin |
| 5,271,290 A | 12/1993 | Fischer |
| 5,275,174 A | 1/1994 | Cook |
| 5,283,970 A | 2/1994 | Aigner |
| 5,298,890 A | 3/1994 | Kanamaru et al. |
| 5,299,810 A | 4/1994 | Pierce et al. |
| 5,309,140 A | 5/1994 | Everett, Jr. et al. |
| 5,334,027 A | 8/1994 | Wherlock |
| 5,436,622 A | 7/1995 | Gutman et al. |
| 5,437,607 A | 8/1995 | Taylor |
| 5,466,213 A | 11/1995 | Hogan et al. |
| 5,471,571 A | 11/1995 | Smith et al. |
| 5,547,382 A | 8/1996 | Yamasaki et al. |
| 5,570,111 A | 10/1996 | Barrett et al. |
| 5,575,761 A | 11/1996 | Hajianpour |
| 5,588,139 A | 12/1996 | Lanier et al. |
| 5,596,347 A | 1/1997 | Robertson et al. |
| 5,625,575 A | 4/1997 | Goyal et al. |
| 5,690,582 A | 11/1997 | Ulrich et al. |
| 5,757,358 A | 5/1998 | Osga |
| 5,766,016 A | 6/1998 | Sinclair et al. |
| 5,785,630 A | 7/1998 | Bobick et al. |
| 5,802,353 A | 9/1998 | Avila et al. |
| 5,805,165 A | 9/1998 | Thorne, III et al. |
| 5,808,601 A | 9/1998 | Leah et al. |
| 5,835,693 A | 11/1998 | Lynch et al. |
| 5,844,392 A | 12/1998 | Peurach et al. |
| 5,896,139 A * | 4/1999 | Strauss ....................... 345/440 |
| 5,956,040 A | 9/1999 | Asano et al. |
| 5,973,678 A | 10/1999 | Stewart et al. |
| 5,977,977 A | 11/1999 | Kajiya et al. |
| 5,999,185 A | 12/1999 | Kato et al. |
| 6,028,593 A | 2/2000 | Rosenberg et al. |
| 6,046,726 A | 4/2000 | Keyson |
| 6,078,308 A | 6/2000 | Rosenberg et al. |
| 6,084,587 A | 7/2000 | Tarr et al. |
| 6,111,577 A | 8/2000 | Zilles et al. |
| 6,131,097 A | 10/2000 | Peurach et al. |
| 6,157,367 A | 12/2000 | Van Der Haar et al. |
| 6,160,489 A | 12/2000 | Perry et al. |
| 6,160,907 A | 12/2000 | Robotham et al. |
| 6,215,495 B1 | 4/2001 | Grantham et al. |
| 6,219,032 B1 | 4/2001 | Rosenberg et al. |
| 6,219,034 B1 | 4/2001 | Elbing et al. |
| 6,252,579 B1 | 6/2001 | Rosenberg et al. |
| 6,266,053 B1 | 7/2001 | French et al. |
| 6,282,455 B1 | 8/2001 | Engdahl |
| 6,326,964 B1 | 12/2001 | Snyder et al. |
| 6,416,327 B1 | 7/2002 | Wittenbecher |
| 6,422,941 B1 | 7/2002 | Thorner et al. |
| 6,424,356 B2 | 7/2002 | Chang et al. |
| 6,765,571 B2 * | 7/2004 | Sowizral et al. ............. 345/420 |
| 6,792,398 B1 * | 9/2004 | Handley et al. ................ 703/2 |
| 7,050,955 B1 * | 5/2006 | Carmel et al. .................. 703/6 |
| 7,061,486 B2 * | 6/2006 | Sowizral et al. ............. 345/420 |
| 7,170,511 B2 * | 1/2007 | Sowizral et al. ............. 345/420 |
| 2002/0003811 A1 | 1/2002 | Herrmann |
| 2004/0236541 A1 * | 11/2004 | Kramer et al. .................. 703/1 |
| 2005/0062738 A1 * | 3/2005 | Handley et al. ............. 345/419 |
| 2006/0122819 A1 * | 6/2006 | Carmel et al. ................. 703/21 |

OTHER PUBLICATIONS

Marcello Pelillo et al., "Matching Hierarchical Structures Using Association Graphs", Nov. 1999, IEEE Transactions on Pattern Analysis and Machine Intelligence, vol. 21, No. 11, pp. 1105-1119.*

Daniel H. Gomez, Marc R. Tremblay et al., "Preliminary Tests of an Arm-Grounded Haptic Feedback Device in Telemanipulation", Nov. 1998, Proceedings of the ASME IMECE Haptics Symposium, five unnumbered pages.*

Baigrie, "Electric Control Loading—A Low Cost, High Performance Alternative," *Proceedings of Interservice/Industry Training Systems Conference*, pp. 247-254, Nov. 6-8, 1990.

Iwata, "Pen-based Haptic Virtual Environment," 0-7803-1363-1/93 IEEE, pp. 287-292, 1993.

Russo, "The Design and Implementation of a Three Degree of Freedom Force Output Joystick," *MIT Libraries Archives* pp. 1-131, May 1990, archived Aug. 14, 1990.

Brooks et al., "Hand Controllers for Teleoperation—A State-of-the-Art Technology Survey and Evaluation," *JPL Publication 85-11*, NASA-CR-175890; N85-28559, pp. 1-84, Mar. 1, 1985.

Jones et al., "A perceptual analysis of stiffness," ISSN 0014-4819 Springer International (Springer-Verlag); *Experimental Brain Research*, vol. 79, No. 1, pp. 150-156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25-44, May 2, 1993.

Snow et al., "Model-X Force-Reflecting-Hand-Controller," NT Control No. NPO-17851; JPL Case No. 7348, pp. 1-4 with 45 pages of attachments, Jun. 15, 1989.

Ouh-Young, "Force Display in Molecular Docking," Doctoral Dissertation, University of North Carolina at Chapel Hill, UMI Order No. 9034744, p. 1-369, 1990.

Tadros, "Control System Design for a Three Degree of Freedom Virtual Environment Simulator Using Motor/Brake Pair Actuators," *MIT Archive*, pp. 1-88, Feb. 1990, archived Aug. 13, 1990.

Caldwell et al., "Enhanced Tactile Feedback (Tele-Taction) Using a Multi-Functional Sensory System," 1050-4729/93, pp. 955-960, 1993.

Adelstein et al., "Design and Implementation of a Force Reflecting Manipulandum for Manual Control research," DSC-vol. 42, *Advances in Robotics*, pp. 1-12, 1992.

Gotow et al., "Controlled Impedance Test Apparatus for Studying Human Interpretation of Kinesthetic Feedback," WA11-11:00, pp. 332-337.

Stanley et al., "Computer Simulation of Interacting Dynamic Mechanical Systems Using Distributed Memory Parallel Processors," DSC-vol. 42, *Advances in Robotics*, pp. 55-61, ASME 1992.

Russo, "Controlling Dissipative Magnetic Particle Brakes in Force Reflective Devices," DSC-vol. 42, *Advances in Robotics*, pp. 63-70, ASME 1992.

Kontarinis et al., "Display of High-Frequency Tactile Information to Teleoperators," *Telemanipulator Technology and Space Telerobotics*, Won S. Kim, Editor, Proc. SPIE vol. 2057, pp. 40-50, Sep. 7-9, 1993.

Patrick et al., "Design and Testing of A Non-reactive, Fingertip, Tactile Display for Interaction with Remote Environments," *Cooperative Intelligent Robotics in Space*, Rui J. deFigueiredo et al, Editor, Proc. SPIE vol. 1387, pp. 215-222, 1990.

Adelstein, "A Virtual Environment System For The Study of Human Arm Tremor," *Ph.D. Dissertation*, Dept. of Mechanical Engineering, MIT, Jun. 1989, archived Mar. 13, 1990.

Bejczy, "Sensors, Controls, and Man-Machine Interface for Advanced Teleoperation," *Science*, vol. 208, No. 4450, pp. 1327-1335, 1980.

Bejczy et al., "Generalization of Bilateral Force-Reflecting Control of Manipulators," *Proceedings Of Fourth CISM-IFToMM*, Sep. 8-12, 1981.

McAffee et al., "Teleoperator Subsystem/Telerobot Demonstrator: Force Reflecting Hand Controller Equipment Manual," *JPL* 1988, JPL D-5172.

Minsky, "Computational Haptics: The Sandpaper System for Synthesizing Texture for a Force-Feedback Display," *Ph.D. Dissertation*, MIT, Jun. 1995, archived Jul. 6, 1995.

Jacobsen et al., "High Performance, Dextrous Telerobotic Manipulator With Force Reflection," *Intervention/ROV '91 Conference & Exposition*, Hollywood, Florida, May 21-23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30-Oct. 1, 1992.

IBM Technical Disclosure Bulletin, "Mouse Ball-Actuating Device With Force and Tactile Feedback," vol. 32, No. 9B, Feb. 1990.

Terry et al., "Tactile Feedback in A Computer Mouse," *Proceedings of Fourteenth Annual Northeast Bioengineering Conference, University of New Hampshire*, Mar. 10-11, 1988.

Howe, "A Force-Reflecting Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR—A Haptic display for speech perception by deaf and deaf-blind individuals," *IEEE Virtual Reality Annual International Symposium*, Seattle, WA, Sep. 18-22, 1993.

Rabinowitz et al., "Multidimensional tactile displays: Identification of vibratory intensity, frequency, and contractor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12-15, 1980.

Bejczy et al., "A Laboratory Breadboard System for Dual-Arm Teleoperation," *SOAR '89 Workshop, JSC*, Houston, TX, Jul. 25-27, 1989.

Ouhyoung et al., "A Low-Cost Force Feedback Joystick and Its Use in PC Video Games," *IEEE Transactions on Consumer Electronics*, vol. 41, No. 3, Aug. 1995.

Marcus, "Touch Feedback in Surgery," *Proceedings of Virtual Reality and Medicine The Cutting Edge*, Sep. 8-11, 1994.

Bejczy, et al., "Universal Computer Control System (UCCS) For Space Telerobots," CH2413-3/87/0000/0318501.00 1987 IEEE, 1987.

Patrick, "Design, Construction, and Testing of a Fingertip Tactile Display for Interaction with Virtual and Remote Environments," *Master of Science Thesis*, MIT, Aug. 1990, archived Nov. 8, 1990.

Calder, "Design of A Force-Feedback Touch-Introducing Actuator For Teleoperator Robot Control," *Bachelor of Science Thesis*, MIT, May 1983, archived Jun. 23, 1983.

Wiker, "Teletouch Display Development: Phase 1 Report," *Technical Report 1230*, Naval Ocean Systems Center, San Diego, Jul. 1988.

Bliss, "Optical-to-Tactile Image Conversion for the Blind," *IEEE Transactions on Man-Machine Systems*, vol. MMS-11, No. 1, Mar. 1970.

Johnson, "Shape-Memory Alloy Tactile Feedback Actuator," *Armstrong Aerospace Medical Research Laboratory*, AAMRL-TR-90-039, Aug. 1990.

Kontarinis et al., "Tactile Display of Vibratory Information in Teleoperation and Virtual Environments," Presence, 4(4):387-402, Harvard Univ., 1995.

Aukstakalnis et al., "Silicon Mirage: The Art and Science of Virtual Reality," ISBN 0-938151-82-7, pp. 129-180, 1992.

Eberhardt et al., "Inducing Dynamic Haptic Perception by The Hand: System Description and Some Results," DSC-vol. 55-1, *Dynamic Systems and Control*: vol. 1, ASME 1994.

Gobel et al., "Tactile Feedback Applied to Computer Mice," *International Journal of Human-Computer Interaction*, vol. 7, No. 1, pp. 1-24, 1995.

Pimentel et al., "Virtual Reality: through the new looking glass," $2^{nd}$ Edition; McGraw-Hill, ISBN 0-07-050167-X, pp. 41-202, 1994.

"Cyberman Technical Specification," *Logitech Cyberman SWIFT Supplement to Logitech Mouse Technical Reference and Programming Guide*, Apr. 5, 1994.

Ouhyoung et al., "The Development of a Low-Cost Force Feedback Joystick and Its Use in the Virtual Reality Environment," *Proceedings of the Third Pacific Conference on Computer Graphics and Applications, Pacific Graphics '95*, Seoul, Korea, Aug. 21-24, 1995.

Kaczmarek et al., "Tactile Displays," *Virtual Environment Technologies*, Chap. 9, pp. 349-414.

Lake, "Cyberman from Logitech," at http://www.ibiblio.org/GameBytes/issue21/greviews/cyberman.html, 1994.

"Component Maintenance Manual With Illustrated Parts List, Coaxial Control Shaker Part No. C-25502," Safe Flight Instrument Corporation, Revised Jan. 28, 2002 (3 pages).

"Technical Manual Overhaul Instructions With Parts Breakdown, Coaxial Control Shaker Part No. C-25502," Safe Flight Instrument Corporation, Revised Jul. 15, 1980 (23 pages).

Scannell, "Taking a Joystick Ride," *Computer Currents*, Boston Edition, vol. 9, No. 11, Nov. 1994.

Yamakita et al., "Tele-Virtual Reality of Dynamic Mechanical Model," *Proceedings of the 1992 IEEE/RSJ International Conference on Intelligent Robots and Systems*, Raleigh, NC, Jul. 7-10, 1992.

Noll, "Man-Machine Tactile," *SID Journal*, Jul./Aug. 1972 Issue.

Rosenberg, "Virtual Fixtures: Perceptual Overlays Enhance Operator Performance in Telepresence Tasks," *Ph.D. Dissertation*, Stanford University, Jun. 1994.

Zilles, "A Constraint-Based God-Object Method for Haptic Display," Department of Mechanical Engineering, Artificial Intelligence Laboratory; Massachusetts Institute of Technology, undated.

"Composition and Linking In Time-Based Hypermedia", L. Hardman, Hypertext 99, ACM 1-58113-064-3/99/2, ACM 1999.

"Polygonal Simplification: An Overview", Erikson, UNC-Chapel Hill, TR96-016, 1996.

"Synchronization in Multimedia Data Retrieval", A. Hac, International Journal of Network Management, vol. 7, 33-62, 1997.

"Haptic Sculpting of Dynamic Surfaces", F. Dachille, 1999 Symposium on Interactive 3D Graphics, pp. 103-110, ACM Apr. 1999.

"V-Collide: Accelerated Collision Detection for VRML", T. Hudson, VRML 97, pp. 117-124, ACM 0-89791-886-x/97/02, ACM 1997.

"Distributed Open Inventor: A Practical Approach to Distributed 3D Graphics", G. Hesina, VRST 99, ACM 1-58113-141-0/99/12 ACM 1999.

"Virtual Objects in the Real World", D. G. Aliaga, Communications of the ACM, Mar. 1997, vol. 40, No. 3, ACM 1997.

"Maptic Rendering: Programming Touch Interaction with Virtual Objects", K. Salisbury et al, ACM 0-89791-736-7/95/0004, 1995.

Aiger et al., "Real-Time Ultrasound Imaging Simulation", 23 pages, 1998.

Bro-Nielsen, Morten, "Finite Element Modeling in Surgery Simulation," Proceedings of The IEEE, vol. 86, No. 3, Mar. 1998, pp. 490-503.

Brooks, Frederick P. et al., "Project GROPE-Haptic Displays for Scientific Visualization," Computer Graphics, vol. 24, No. 4, Aug. 1990, pp. 177-185.

MacLean, Karon E., "The Haptic Camera: A Technique for Characterizing and Playing Back Haptic Properties of Real Environments," Interval Research Corporation, 1996, 9 pages.

Minsky, Margaret et al., "Feeling and Seeing: Issues in Force Display," Dept. of Computer Science, 1990, pp. 235-242, 270.

Su, S. Augustine et al., "The Virtual Panel Architecture: A 3D Gesture Framework," Computer Science Department, 1993, pp. 387-393.

\* cited by examiner

SYSTEM, METHOD AND DATA STRUCTURE FOR SIMULATED INTERACTION WITH GRAPHICAL OBJECTS

RELATED APPLICATIONS

This application is a continuation of U.S. patent application Ser. No. 09/675,811, now U.S. Pat. No. 7,050,955, entitled "System, Method and Data Structure for Simulated Interaction with Graphical Objects", filed Sep. 29, 2000 which, in turn, claims the benefit of U.S. Provisional Patent Application Ser. No. 60/157,272 filed Oct. 1, 1999 entitled "Data Structures and Algorithms For Simulated Interaction With Graphical Objects", both of which applications are hereby incorporated by reference as if set forth fully herein and are commonly owned.

FIELD OF THE INVENTION

This invention pertains generally to computer graphics and to two-dimensional and three-dimensional simulation and interaction with objects represented by such graphics, and more particularly to system, method, data structures, and computer programs for simulated interaction with such graphical and virtual objects.

BACKGROUND

Heretofore the ability to integrate real-time three-dimensional hand interaction into software applications has been some what limited and has required a relatively high level of skill among practitioners. Complex three-dimensional worlds have not been easy to simulate and frequently such simulations where performed in a rudimentary manner as the required results would not support the massive efforts needed to understand the simulated environment, objects in that environment, or the input/output devices with interaction with the environment and objects would be made. Nor has it been practical to was time developing complex scene graphs and mapping between the several scene graphs that might typically be present. System interaction and the visual and tactile/force feedback were also in need of improvement, particularly where it was desired that visual feedback cues be synchronized with tactile and force cues, especially for had grasping interactions of virtual objects.

These and other limitations have been addressed by the inventive system, method, data structures, computer program, and computer program product of the invention.

SUMMARY

Figure 1:
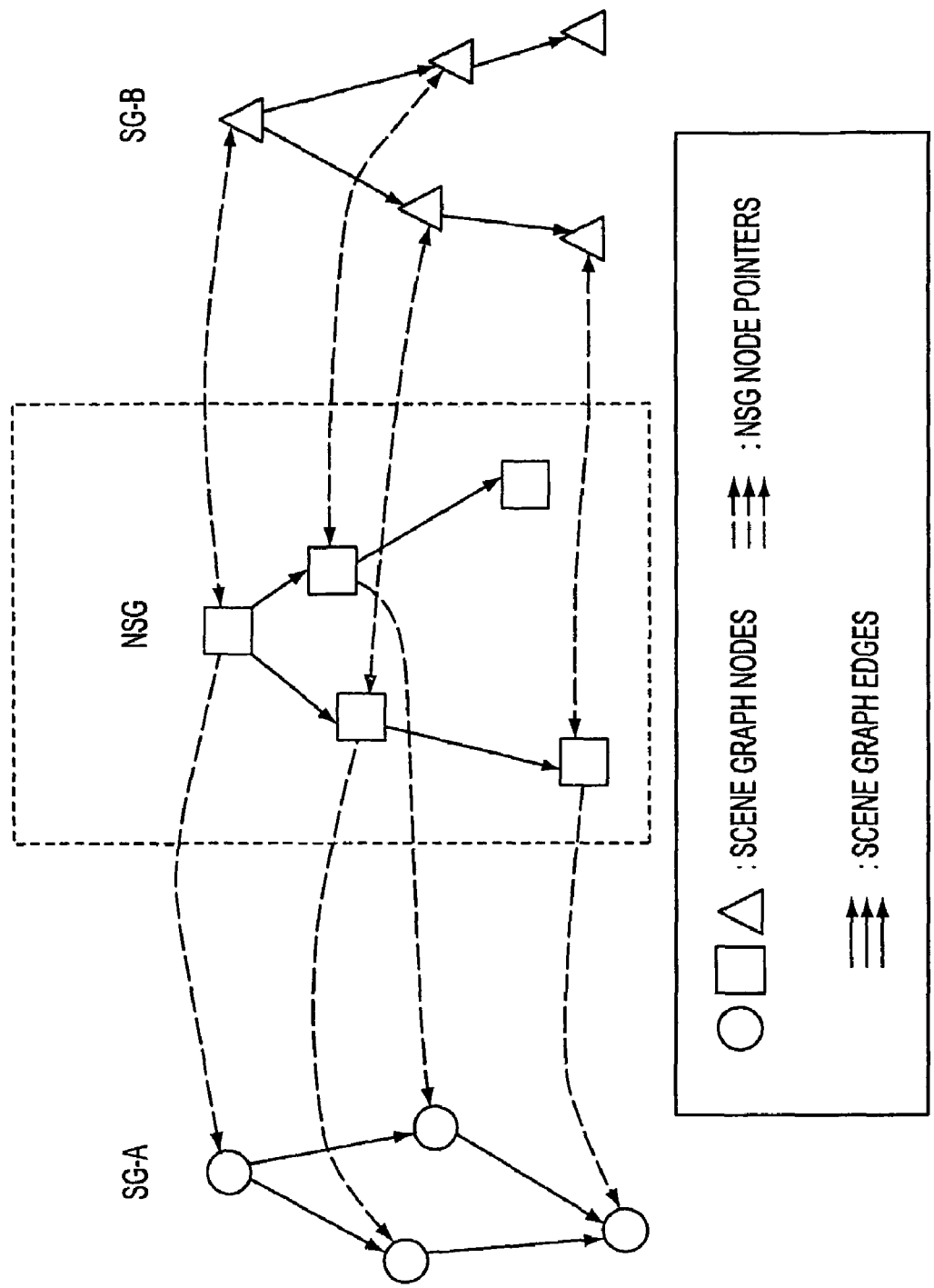
FIG. 1 is a diagrammatic illustration showing an exemplary embodiment of an inventive Neutral Scene Graph (NSG) in relation to two other scene graphs.

The invention provides structure, method, computer program and computer program product for novel object simulation and interaction of and between computer generated or graphical objects in virtual space. These include novel Neutral Scene Graphs data structures and procedures for using such graphs, Object-Manipulation Procedures, and impedance mode procedures and techniques for simulating physical interaction with computer generated graphical objects in virtual space.

DETAILED DESCRIPTION OF EMBODIMENTS OF THE INVENTION

Aspects and embodiments of the invention are now described relative to the figures. Three aspects of the invention are first described all pertaining to different aspects of simulation and interaction between computer generated or graphical objects in virtual space. These aspects involve: (i) Neutral Scene Graphs, (ii) Object-Manipulation Algorithms and Procedures, and (iii) Impedance mode procedures and techniques. In general each of the aspects involves a certain methodological or procedural steps that are conveniently implemented on either a general computer system of the type having a processor and memory coupled to the processor, input/output devices, and other elements that are known in the art of personal computers. The invention may also be practiced with special purpose computers or in hardware. Data structures are also created and used relative to at least some of the inventive procedures.

After these three aspects have been described in some detail, the implementation of one particular embodiment of the invention as computer software is described in considerable detail so that the interaction between the above described three aspects and other elements of a simulation and interaction system and method may more clearly be understood. This implementation is referred to as the Virtual hand Toolkit (VHT) which is a component of the Virtual hand Suite 2000.

Description of Embodiments of Neutral Scene Graphs, Object-Manipulation, and Impedance Mode Techniques Neutral Scene Graph In a first aspect, the invention provides a system, apparatus, method and computer program and computer program product for relating two or more scene-graph data structures. As used in this description as well as in the applicable arts, a scene graph may be thought of broadly as a data structure that structures or organizes a collection of nodes into a hierarchy through the use of directed edges. In addition, a scene graph typically has no cycles, which means that it is not typically possible to follow a sequence of edges and arrive at the starting node. The technical term for this type of graph structure is a directed acyclic graph (DAG). Directed acyclic graphs are known in the art and not described in further detail here. In practice, non-terminal nodes (that is, those nodes with directed edges leaving the node) of a scene graph are called or referred to as group nodes. Group nodes may also contain one or more homogeneous transformation matrices. A path in a scene graph is a set of nodes and edges that ends at a terminal node. The product of any transformation matrices encountered in a path provides the frame (position, orientation) of the terminal node with respect to the node at the start of the path.

A Neutral Scene Graph (NSG) is a structure as well as a mechanism or procedure for relating two or more scene graphs. An NSG may for example, provide a topological mapping between multiple scene graphs. An NSG is typically a directed acyclic graph (DAG) where each node may contain pointers to one or more nodes in the scene graphs the NSG is to relate.

One use for such an NSG is to synchronize two or more "asynchronous" scene graphs in time. A set of "synchronizing" NSGs may, for example, be used to synchronize a set of "asynchronous" scene graphs. In addition to synchronizing asynchronous scene graphs, NSGs may also provide additional information, functions, one or a set of indicators, flags, transformations, instructions for data manipulation, other information, and the like. An NSG may but does not need to preserve the connectivity of the graphs it relates.

A transformation introduced by an NSG may provide a mapping between a node in a first graph to a node in a second graph or between a node in the second graph to a node in the first graph. Where more than two graphs are involved, the NSG may introduce multiple transformations for mapping nodes in and between each of the two or more graphs. The direction of the mapping may be provided by a flag or other indicator or information item. Other flags, indicators, or information items may be used to hold information about the state of synchronization of various graphs.

Graph traversals of an NSG may provide a mechanism for asynchronously synchronizing the nodes in one or more graphs. The one or more graphs may be updated independently and/or in separate threads or processes.

A set of NSGs may also be used to map between two or more sets of graphs. A separate NSG may be used to synchronize each graph pair.

In one exemplary embodiment, illustrated in FIG. 1, one NSG synchronizes two scene graphs, graph A (SG-A) and graph B (SG-B), and each node in the NSG (nodes shown as square box) contains two pointers, one to a node in graph A (nodes shown as round circles) and one to a node in graph B (nodes shown as triangles). NSG pointers are also illustrated as are scene graph edged using different arrow heads as indicated in the figure key.

In another exemplary embodiment, an NSG provides the mapping between: (1) a graphical scene graph (GSG), such as OpenInventor, OpenGL Optimizer, Performer, and the like, or any other graphical scene graph application program interface (API); and (2) a haptic scene graph (HSG) or an interaction scene graph (ISG). In this second embodiment, the HSG is typically a scene graph of the type used for fast collision detection between virtual objects in a simulated two-dimensional (2D) or three-dimensional (3D) environment. In this embodiment, the NSG is constructed to map the haptic scene graph (HSG) and the graphical scene graph (GSG). There is a transformation in each NSG node that is a function that converts a homogeneous transformation matrix in HSG form into a transformation matrix in the desired GSG form. This transformation is invertible, and the direction of the update is controlled by a flag, indicator, or other control device. In some instances, the transformation may be a unity or identity transformation.

The Neutral Scene Graph (NSG) described here is particularly useful since typically computer graphics associated with a 2D or 3D simulation only needs to be updated from between about 10 times per second to about 60 times per second since these rates are typically sufficient to support visual observation. In contrast, a haptic (i.e., force feedback) display and the associated interactive mathematical model of the simulation typically requires (or at least greatly benefits from) much faster update, such as more than 100 times per second and typically from about 1000. times per second to 2000 times per second or more. Thus, the graphical update (e.g. 10-60 times/second update frequency) can advantageously be run or executed in a separate computer program software thread, and at a much different update rate, from the corresponding haptic or interaction thread (e.g. 1000-2000 times/second update frequency). Those workers in the art will appreciate that these data update frequencies are provided for the purpose of illustration and that the invention itself is not limited to any particular update rate or frequency. The inventive NSG provides an efficient mechanism to ensure that the updated graphical data remains synchronized with the corresponding updated haptic or interaction data, even if and when they are updated at different times and intervals.

Embodiment of Object-Manipulation Structure and Procedure

In a second aspect, the invention also provides an object-manipulation data structure, procedure, algorithm, computer program and computer program product which uses a static-friction approximation with parameters to allow user control over the ease of manipulation or control of virtual objects. Each collision event detected between a portion of a grasping (or contacting) virtual object (such as a graphical hand) and a virtual object to be grasped (or contacted) yields a contact normal data (or signal), which is input to a state machine and more particularly to a manipulation finite-state machine (MFSM).

Each virtual object to be grasped (or otherwise contacted) has an associated MFSM that in turn has an associated grasping virtual object "parent," referred to as the GParent. (For simplicity of explanation, a grasping type contact will be assumed for purposes of description here, but the invention is not limited only to grasping type contact.) A GParent is a virtual object that is capable of grasping another virtual object. A GParent may be any virtual object independent of a virtual object to be grasped, and each GParent virtual object may have any number of other virtual objects using it as a GParent. Collision information between a virtual object to be grasped and its GParent is used in the inventive algorithm, method, and computer program. The state of the manipulation finite-state machine (MFSM) determines how a virtual object behaves with respect to it GParent.

Figure 2:
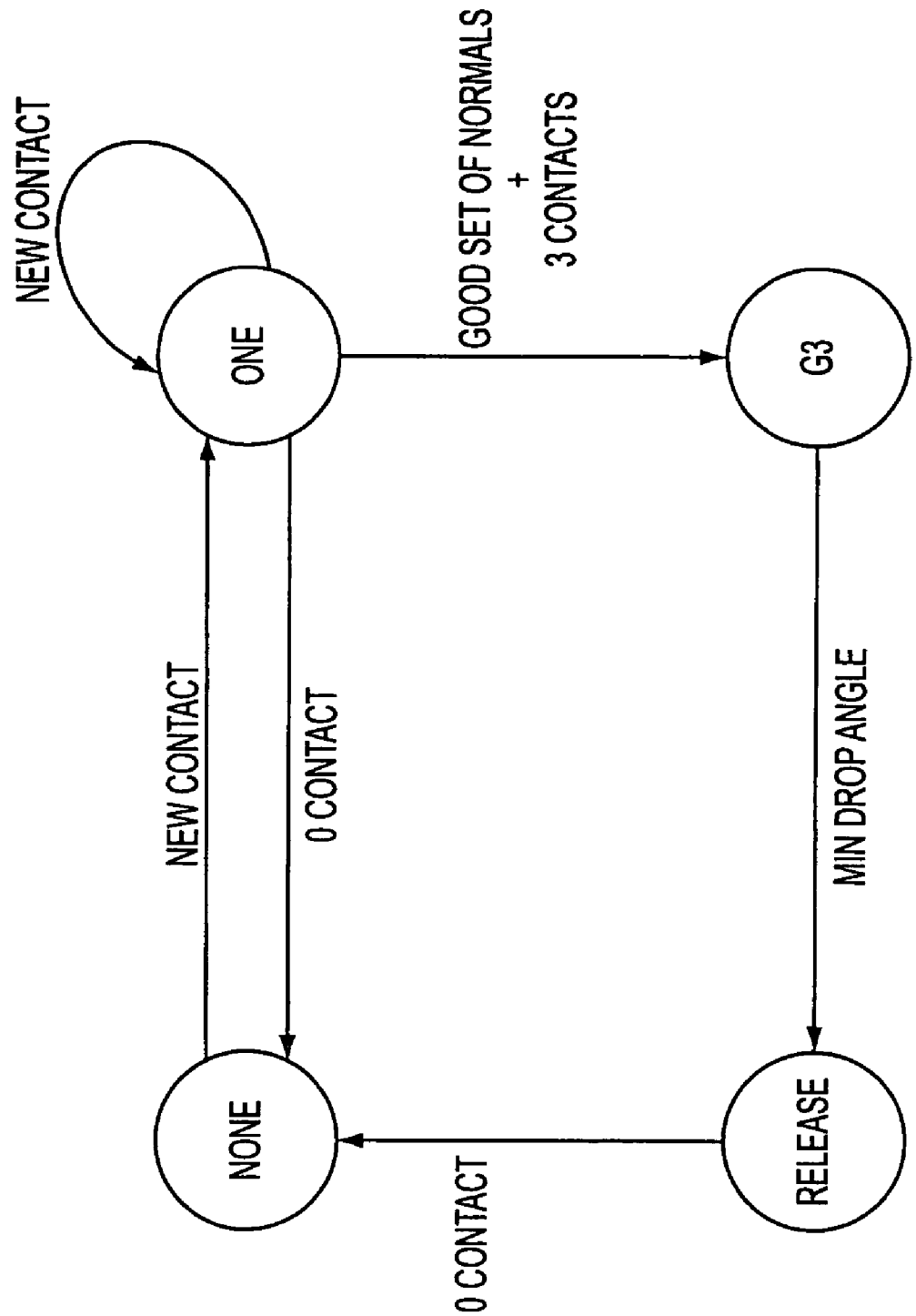
FIG. 2 is a diagrammatic illustration showing an exemplary embodiment of a Manipulation Finite-State Machine (MFSM) and the states and transitions represented therewith.

An exemplary embodiment of a MFSM is illustrated in FIG. 2, and includes the following states: NONE, ONE, G3, and RELEASE. In the "NONE" state, the virtual object to be grasped is not in a graspable state. In the "ONE" state, there are insufficient contacts and contact normals to fully constrain the virtual object with respect to the GParent. The object may only be manipulated around by the contact point. In the "G3" state, there are at least three "grasping" contact points whose contact normals each have at least some specified minimum angular separation. The virtual object to be grasped is considered fully constrained by its GParent. In the "RELEASE" state, the object was previously constrained to the GParent but is now in the process of being released.

Transition of and between the states in the exemplary embodiment of the MFSM of FIG. 2 are governed by various parameters including but not limited to the following parameters: minimum normal angle (MinNormalAngle), minimum drop angle (MinDropAngle), number of drop fingers (NumDropFingers), and grasp one cone slope (GraspOneConeSlope).

The minimum normal angle (MinNormalAngle) parameter includes an angular quantity giving the minimum angular separation of all contact normals required to enter a G3 state.

The minimum drop angle (MinDropAngle) parameter is an angular quantity specifying the angle limit for a GParent Manipulator relative to a reference datum necessary for the manipulator to not be classified as a Drop Finger. A Manipulator is defined as the vector from a reference point on the GParent to a contact point on the parent so that the MinDropAngle specifies the angle limit for a GParent Manipulator relative to a reference datum necessary for the manipulator to not be classified as a Drop Finger. When the GParent is a graphical hand, this manipulator is the vector from the metacarpaophalangeal joint of the hand to the contract point on the finger. The MinDropAngle may be defined as the angle of a manipulator relative to the palm of the hand (i.e., the metacarpus), beyond which, the manipulator is classified as a Drop Finger. The minimum drop angle (MinDropAngle) may also be defined as a maximum allowable change in angle of a manipulator relative to an angle of the manipulator while the finger is in contact with the virtual object to be grasped (such as the angle of the manipulator just before contact ceases).

The number of drop fingers (NumDropFingers) parameter includes the number of manipulators whose angles do not exceed the MinDropAngle requirement, beyond which number the grasped virtual object enters the Release state.

The grasp one cone slope (GraspOneConeSlope) parameter includes the angular tolerance of the contact normal for maintaining a ONE state.

The MFSM may optionally depend on either the position or velocity of the contact points, but generally need not depend on either the position or velocity of the contact points. The contact condition may be characterized merely by a normal, so the virtual object to be grasped does not have to be in actual contact with a GParent to undergo a state transition. A separate invisible (e.g., non-rendered) representation of the virtual object may be used by the MFSM, and may be increased in size, scaled, or otherwise augmented or padded with a manipulation layer to make it easier to manipulate or to otherwise alter or augment its manipulation characteristics. This also permits virtual objects to be manipulated remotely.

With further reference to the state diagram of FIG. 2, the diagram illustrates possible state transitions between the states of the MFSM that can occur during the state recalculation. These transitions include a transition from NONE to ONE in response to a "new contact" condition, and a transition between ONE and NONE in response to a "0 contact" (zero contact) condition. New contact is the condition when a point on the GParent, which in the previous iteration was not in contact with the virtual object to be grasped, comes into contact with the virtual object. Zero Contact (or no contact) is the condition when in the previous algorithm iteration there was at least one point on the GParent in contact with the virtual object to be grasped, but there are no longer any such contact points. The manipulation state also transitions from RELEASE to NONE in response to the "0 contact" condition. Manipulation state transitions from the ONE state to the G3 state when there are a good set of normals and three contacts. Normals are considered to be good when there is at least one pair of contact normals which have an angle between them exceeding the MinNormalAngle parameter. The manipulation state in the MSFM transitions from G3 to RELEASE when the number of "manipulators" which have an angle less than the minimum drop angle is not greater than or equal to NumDropFingers. An example value for NumDropFingers is 2. Once the state machine is in the ONE state, it will remain in that state when any new contact condition occurs, unless conditions are met to transition to the G3 state.

One embodiment of the inventive grasping method, algorithm, procedure, and computer program includes the following steps. While the grasping or manipulation simulation is running (typically by executing the simulation program in processor and memory of a general purpose digital computer), the neutral scene graph (described above) synchronization procedure is executed to synchronize the graphical scene graph and the interaction (or haptic or collision) scene graph. In this embodiment, the graphical scene graph comprises an OpenGL representation of the GParent and virtual object to be grasped. Also in this embodiment, the interaction scene graph comprises features of the GParent and virtual object that may be different from their respective OpenGL representations. For instance, the virtual object may be scaled larger to make it easier to grasp, have sharp edges smoothed so a haptic display does not go unstable, be represented by one or a set of simpler geometric shapes to make interaction calculations more efficient, and the like (Step 102). Next, the virtual objects that are in the ONE or G3 state are either in contact with the GParent or are being grasped by it, and are thus constrained to move based on their relationship with their associated GParent, (Step 104). More than one MFSM will be provided when there is more than one virtual object to be grasped, a single MFSM process being allocated to each virtual object to be grasped.

Collision checks are then performed between the manipulator and the virtual environment (Step 106). Here the manipulator is defined to include the portion of the GParent in contact with a virtual object. In a useful embodiment, collision checking is done using the VClip algorithm known in the art. In one embodiment of the invention, collision detection may utilized the techniques described in co-pending U.S. Utility application Ser. No. 09/432,362 filed Nov. 3, 1999 and entitled "System And Method For Constraining A Graphical Hand From Penetrating Simulated Graphical Objects," which is hereby incorporated by reference.

For each collision that is detected, the collision information, including (1) the contact point between the manipulator (i.e., the object pointed to by GParent, which is sometimes referred to as the Virtual End Effector) and the virtual object, (2) the normal to the contact point, and the like, are sent to the MFSM corresponding to the object that is colliding with the manipulator (Step 108). Finally, the grasping state for all MFSMs are recalculated at the interaction update rate, which is typically as fast as the interaction software thread can run. Exemplary pseudo code for the grasping algorithm is set forth immediately below:

```
while( simulation running )
    perform NSG synchronization with graphics and collision graph
    for all objects in the ONE or G3 states, constrain their placement and
    movement to the placement and movement of the associated
    manipulator (a.k.a. VEE)
    perform collision check between manipulator and virtual environment
    for each collision
        send collision information (contact point, normal, etc.) to the
        MFSM corresponding to the object colliding with the manipulator
    recalculate grasping state for all MFSMs
```

Exemplary computer program source code for one particular embodiment of the manipulation (grasping) state-machine class is provided in Appendix I. A CDROM containing executable code is provided in Appendix II, and a Programmer's Guide is provided in Appendix III.

Embodiment of Impedance Mode Structure and Procedure

In yet another aspect, the subject invention provides a haptic-control technique for low-bandwidth updates of a force-feedback controller and a force-feedback controller and method of control incorporating or utilizing these low-bandwidth haptic-control updates. This inventive technique is particularly applicable to situations where a simulation is executing asynchronously (either on the same computer in a different thread or on a separate computer) from an associated force-control process.

For the purpose of this description, we refer to a Physical End Effector (PEE) as a physical device (typically a mechanical or electromechanical device) which can apply force to a physical user, and we refer to a virtual end effector (VEE) as the virtual object or objects that represent this PEE device in a computer simulation.

The computer simulation software thread communicates to the force-control software thread a Local Surface Approximation (LSA) of a virtual object (or objects) in a region local to a VEE. The force-control software thread then computes the actual force to be generated by the PEE. The control process executes a real-time (or substantially real-time or near real-time) control loop that uses the LSA information to generate a realistic force approximation to the LSA for display on the PEE.

An Local Surface Approximation (LSA) includes an approximation of at least one, and advantageously, each of the factors in a region near the VEE that are likely to influence the VEE. The LSA description may, for example, include information about the geometry, velocity, acceleration, compliance, texture, temperature, color, smell, taste, and the like, or any other physical, static, dynamical or any other property associated with one or more nearby virtual objects. A geometric approximation may, for example, include: (1) a single polygon (such as a virtual object tangent plane), (2) an approximating polyhedron, (3) a parametric surface (such as NURBS or subdivision surfaces), and the like.

Each LSA may also optionally contain information about the surface texture of a portion of a nearby virtual object. Such surface texture may include any haptic-related contact properties, such as contact model parameters like stiffness and damping. Such parameters may be encoded as multiple textures on the geometric surface. Associated with an LSA may be one or a set of flags or other indicia to give information about the contact state, or separation distance, and grasp state of the neighboring virtual objects.

Each VEE in the simulation may have multiple possible LSA's associated with it due to the multiple virtual objects in a simulation. Two exemplary embodiments of procedures for associating LSAs with VEEs are now described. In the first possible procedure, the LSAs are sorted by contact state with assignment to a VEE the LSA closest to it. In a second possible procedure, a new composite LSA that encompasses all LSA's within a fixed distance of the VEE is constructed.

One embodiment of the host-computer-side procedure and algorithm is now described. While the simulation is running or executing on a general purpose computer, collision detection checks are performed between the VEE and the virtual environment (Step 122). In one embodiment of the invention, collision detection may utilized the techniques described in co-pending U.S. Utility application Ser. No. 09/432,362 filed Nov. 3, 1999 and entitled "System And Method For Constraining A Graphical Hand From Penetrating Simulated Graphical Objects," which is hereby incorporated by reference.

Figure 3:
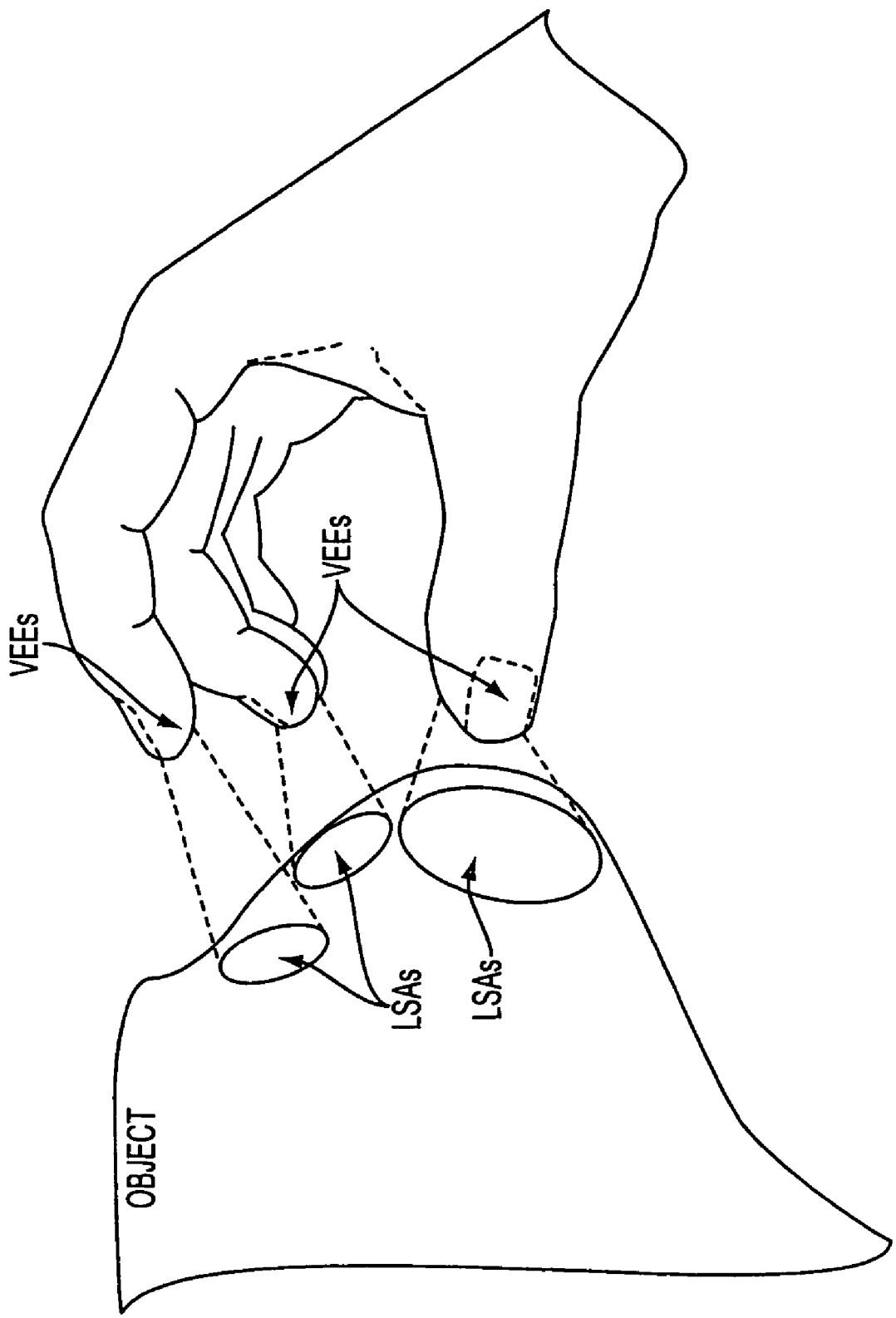
FIG. 3 is a diagrammatic illustration showing a hand and the relationship of the grasping hand to an object, LSAs, and VEEs.

The paragraph above describes the collision-check step, now the remaining steps follow: Construct a set of LSAs for each potential collision between the VEEs and all the virtual objects. Each LSA in the set corresponds to the object portion that is in contact or potential contact with the VEEs (See FIG. 3). The set of LSAs are stored a memory buffer.

For each VEE find the subset of LSAs in the memory buffer that correspond to that particular VEE. Perform one of the following two steps: (i) combine the subset LSA into a single set, and )ii) select the most significant LSA out of the subset. In either case, one LSA is constructed of selected for each VEE. The final step is to send this LSA to the PEE controller.

An exemplary embodiment of the host side procedure is summarized in pseudo-code immediately below.

```
while( simulation running )
    perform collision check between VEE and virtual environment
    for( each collision pair )
        construct LSA to the object portion of the contact pair
        send LSA to command buffer
    for( each LSA in command buffer )
        for( each VEE )
            construct single LSA corresponding to all LSAs for this
            VEE, OR find closest LSA to VEE
    send LSA to PEE controller
```

On the force-control side this procedure and algorithm uses two asynchronous threads of execution, the slow-thread and the fast-thread. The slow-thread uses the LSA information and the Physical End Effector (PEE) model to calculate the corresponding interaction force-field (spatial distribution of interaction forces due to LSA/PEE configuration). The fast-thread uses the latest available force-field (calculated by the slow-thread) and the feedback from the sensors (high bandwidth information) to control the actuator device. Hence, the fast-thread is the dedicated servo controller for the force actuators. De-coupling the slow-thread enables the fast-thread to run at kilohertz rates increasing haptic feedback fidelity.

The fast-thread may employ a variety of control algorithm including control algorithms known in the art and proprietary control algorithms. Such control algorithms, may for example include position control and force control. For example, for position control, the force applied by the PEE is determined based on the discrepancy between desired position and/or velocity of the VEE with respect to the haptic surface texture. For force control, the force applied by the PEE is determined based on the discrepancy between applied and computed forces.

The slow-thread loop and fast-thread loop procedures for each Physical End Effector (PEE) are now described. For the slow code thread loop the procedure for each PEE is as follows: First, the LSA is projected into the actuator domain. Next, the PEE model is projected into the actuator domain. Finally, collision detection is performed in the actuator domain to calculate or otherwise determine a corresponding force field.

The fast code thread loop runs at a higher frequency such as for example between 1 kHz and 2 kHz. For each PEE, the fast sensors are read and mapped. Fast sensors may for example include feedback or other signals or data from encoders, tachometers force sensors, or the like. Next, discrepancies between current (measured) and desired force field are calculated. Finally, the corresponding control signal is calculated and then applied to affect the desired control An exemplary embodiment of the Physical End Effector (PEE) side slow-thread and fast-thread loop control procedures are summarized in pseudo-code immediately below.

```
SLOW-THREAD LOOP
for( each Physical End Effector- PEE )
    project LSA into actuator-domain
    project PEE model into actuator-domain
    perform collision detection in actuator domain to calculate
    corresponding force field.
-FASTER-THREAD LOOP (1KHz)
for( each PEE)
    read and map fast sensors (feedback from encoders, tachometers force
    sensors, etc.)
    calculate discrepancies between current (measured) and desired force
    field
    calculate and apply corresponding control signal.
for( each PEE )
    project LSA into actuator-domain
    project PEE model into actuator-domain
    perform collision detection in actuator domain to calculate
    corresponding force field.
```

Embodiment of Virtual Hand Toolkit (VHT) and Virtual Hand Suite

The Virtual Hand Toolkit (VHT) is the application development component of the VirtualHand Suite 2000, which also includes the Device Configuration Utility and the Device Manager. The later two components are described in detail in the VirtualHand Suite User's Guide. These technology is developed by Virtual Technology, Inc. of Palo Alto, Calif.

Virtual Technology Inc (Vti) hardware will typically ship with basic software to help users access devices however, purchasing the VirtualHand Suite offers significant additional functionality, including the complete set of libraries included in the VHT. The goal of VHT is to help developers easily integrate real-time 3D hand interaction into their software applications thus minimizing development efforts. Complex 3D simulated worlds are not easy to implement, and programmers can't afford to spend the time required to understand all the inner workings of advanced input/output devices such as the CyberGlove, CyberTouch and CyberGrasp. Nor can they waste time on other complex issues such as collision-detection, haptic scene graphs, event models and global system response.

In a conventional application development environment, with an integrated graphical user interface, programmers are provided with implicit operation of the mouse, windows, document containers and various widgets. The Virtual Hand Toolkit (VHT) takes a similar approach, offering automatic management of virtual hands, a simulated world with graphical representation and an expandible model for handling interactions between world entities.

The VHT is transparent to the programmer's work, as its core is based on a multi-threaded architecture backed with event-based synchronization. This is similar to GUI-based applications where the programmer need not manage the mouse or service GUI events. The application development process should focus on application-specific functionality, not low-level details. To develop an application that makes use of Virtual Technologies' whole-hand input devices, the softwar designer is provided with an application model that consists of three major components:

Virtual human hand

Object manipulation and interaction

Rendering

The Virtual Hand Toolkit (VHT) is divided into a number of functional components. This fact is reflected in the division of the libraries. The toolkit is now implemented by two libraries and a set of support libraries.

All purchased VTi hardware comes basic software that includes the Device Configuration Utility, Device Manager and the Device layer part of the Virtual Hand Toolkit. This includes VTi hardware support in the form of device proxy classes as well as a set of classes for doing 3D math and finally a set of exception classes. The basic device layer is described in detail in Chapter 4.

The main functionality of the VHT is contained in the Core layer and includes both the haptic and neutral scene graphs, simulation support, collision interface, model import, human hand support (including grasping and ghosting).

Figure 4:
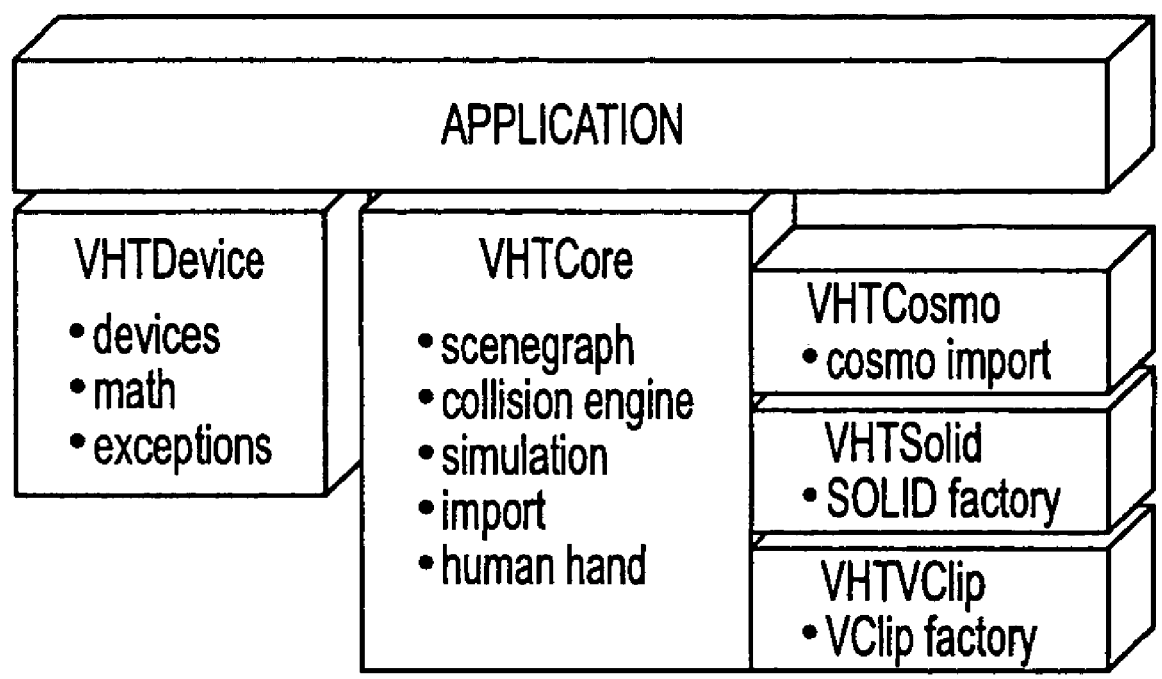
FIG. 4 is a diagrammatic illustration showing aspects of relationships between levels for local geometry level collision.

Third-party support packages and interfaces are located in separate specific libraries. For example, support for the Cosmo/Optimizer display engine and import into the VHT is located in a separate library. Also, local geometry level collision detection is externalized and the VHS includes two modules that may be used. The relationships between these levels can be seen in FIG. 4.

The next sections describe all the components of the VHT and the typical usage of each of the classes that make them up. A complete working example is also presented throughout the chapters, for a hands-on experience of application development.

Those workers having ordinary skill in the art are assumed to have a working understanding of C++ programming language and are proficient with a development environment on their platform (such as Windows NT or SGI IRIX). Some basic knowledge of 3D graphics is also assumed. Additional background information to provide or supplement this knowledge is provided in standard textbooks such as: *Computer Graphics, Principles and Practice*, J. Foley, A. van Dam, S. Feiner, J. Hughes. 2nd Edition, Addison-Wesley, 1996; and *The C++ Programming Language*, Bjarne Stroustrup, 3rd Edition, Addison-Wesley, 1997; each of which is hereby incorporated by reference. In this section, an overview of the Virtual Hand Toolkit (VHT) is presented. Simple examples are used to illustrate the usage of the main classes in the VHT. Furthermore, the proper development environment settings (for NT/2000 and IRIX) are explained. For a fuller understanding and discussion of the classes, please refer to the subsequent sections (chapters).

Virtual Human Hand

In an application, the Virtual Human Hand class (vhtHumanHand) is the high-level front-end for Virtual Technologies' whole-hand input devices. It lets the developer easily specify what kind of devices are to be operated, and where they are serviced. Then it takes care of all further operations automatically. The aim is to make these advanced I/O devices as transparent as possible, much like the computer mouse in traditional applications.

Object Manipulation and Interaction

Developing an interactive 3D application is a complex process because of the necessity of defining simulated objects and controlling their state at run-time. The VHT has a significant section dedicated to these particular tasks. The Haptic Hierarchy and associated import filters provide a simple way to specify the geometrical and physical details of digital objects. The Collision Detection Engine keeps track of any contact between objects as they move or change shape and provides the simulation environment with this information in a multi-threaded fashion.

Rendering

Most applications need to present the mathematical and geometrical information discussed in the previous sections in a more visual form, namely as 3D digital objects. Although that particular task does not involve the VHT, close cooperation is required to achieve realistic rendering. For this the VHT provides a Data-Neutral Scene Graph that binds user-specific data with haptic objects for synchronization, or notification of haptic events. It also offers the functionality to render digital hands that closely mimic the behavior of a human hand being measured by a VTi instrumented glove such has the CyberGlove.

Creating an Application

There are three simple steps to follow when using the VHT as the main haptic simulation loop of your application. In this guide, we present the most common approach: connecting to a CyberGlove and a six degree-of-freedom (6-DOF) position tracker (Polhemus or Ascension), associating the devices to the application's virtual hand (vhtHumanHand instance), and creating the support environment with the vhtEngine and vhtSimulation classes. If you have not already done so, you should refer to the VirtualHand Suite User's Guide as well as the hardware manuals before proceeding further.

Setting-Up a Virtual Hand

The Virtual Hand Toolkit uses a client/server architecture in which the user's application acts as the client. The physical devices reside on the server side, also known as the Device Manager. The Device Manager can be running on the same machine as your application, or on any other machine on your network (or even the Internet, although performance may suffer). In either case, it is necessary to specify which of the devices are going to be used by the application.

The address of a CyberGlove is given through a helper class named vhtIOConn. The straightforward use of vhtIOConn is through VTi's resource registry, which is specified in an external file. If the VTI_REGISTRY_FILE environment variable specifies a registry file, then to attach to the default glove you only have to do:
vhtCyberGlove*glove=new vhtCyberGlove(vhtIOConn::getDefault(vhtIOConn::glove));

One can also provide all the details in your code. We will use as an example a setup in which the Device Manager is running on the same machine as 5the application (localhost), the device being used is a CyberGlove (cyberglove) and it is connected on the first serial port (COM1) and running at maximum speed (115200 baud).

The address of the CyberGlove is specified as:
vhtIOConn gloveAddress("cyberglove", "localhost", "12345", "com1", "115200");

The third parameter in the gloveAddress specification is the port number of the Device Manager which by default is 12345. Should you encounter problems connecting, you should contact the person who installed the Device Manager to know if it is expecting connections on a different port number.

Once the address is specified, the actual connection to the server is obtained by creating a device proxy, using the class vhtCyberGlove. This is easily achieved by using the following line:
vhtCyberGlove*glove=new vhtCyberGlove(&gloveAddress);

When the vhtCyberGlove instance is created, it does all the necessary work to locate the Device Manager, to find the right device and to create a continuous connection between the application and the Device Manager.

In a similar fashion, a proxy to the default tracker is instantiated by:
vhtTracker*tracker=new vhtTracker(vhtIOConn::getDefault(vhtIOConn::tracker));

We can also specify which of the tracker's position receivers to use (some have more than one). An individual tracker receiver is supplied by the vhtTracker::getLogicalDevice method, which returns a vht6Dof Device instance. Thus, the following code segment gets the first receiver on the tracker, and associates it with the glove defined previously through the helper class vhtHandMaster:
vht6DofDevice*rcvr1=aTracker->getLogicalDevice(0);
vhtHandMaster*master=new vhtHandMaster(glove, rcvr1);

Finally, the vhtHandMaster is supplied to the constructor of vhtHumanHand to create a fully functional Virtual Human Hand instance:
vhtHumanHand*hand=vhtHumanHand(master);

At this point, the vhtHumanHand object is ready to be used as a data-acquisition device. We are interested in using it at a higher-level, so the next step is to set up a more elaborate environment.

Setting-Up a vhtEngine

The vhtEngine is a central container for the VHT runtime context. For normal operations, you will create a single instance of the vhtEngine class in your application, like this:
vhtEngine*theEngine=new vhtEngine( );

When the global vhtEngine object is available, the vhtHumanHand created in the previous section can be registered for automatic management. This is done with a call to the vhtEngine::registerHand method:
theEngine->registerHand(hand);

Once the hand is registered, the automatic update mechanism of the vhtEngine will take care of fetching the latest data from the devices it relates to. By default, the vhtEngine does all operations from its own thread of execution, including managing the vhtHumanHand instance.

Creating a Simulation Framework

The two previous steps created a transparent infrastructure for an application that will perform hand-based manipulation. The next step is to supply the extension path through which the application will interact with the VHT and provide it with the simulation logic. The VHT requires that some kind of simulation logic be registered with the vhtEngine. For the most basic cases, you can use the vhtSimulation class. You register a simulation object in the vhtEngine instance as follows:
theEngine->useSimulation(new vhtSimulation( ));
theEngine->start( );

When the vhtEngine instance has all its necessary information, the start( ) method can be called. At that point, a private thread is launched and it will work in the background to do all the necessary management.

Putting Objects in the Environment

The VHT helps applications deal with more than just hand data—it is designed to ease the task of developing applications that require the manipulation of arbitrary 3D digital objects. For this purpose, a haptic scene graph framework is provided, along with an external data import mechanism.

The haptic scene graph can be constructed by specifying the geometry of simple objects from within the application. Given the complexity of the average digital object, applications will most likely import object descriptions from data files generated by third party 3D modellers.

Specifying Objects

Two kind of geometries are supported as nodes of the haptic scene graph: polyhedrons, and elementary common shapes like spheres and cubes.

Polyhedrons are useful for approximating most surfaces found on objects. It is common for 3D modellers to generate triangle-based faces of complex geometries, as they are simple to manage and they have good properties for visual rendering. In the VHT, instances of the vhtVertexGeometry class represent polyhedrons.

When analytical surfaces are required, one can use the elementary common shapes by instantiating objects using the vhtVertexBox, vhtVertexSphere and other basic shape classes. While these geometries are not as common in real-world simulations, they offer the advantage of being well-defined. Although this current version of the VHT does not perform any optimization on these surfaces, future versions will take advantage of their known mathematical properties to process operations faster than with general polyhedra.

Adding Objects

Creating Shapes Explicitly Using the VHT

One may create a polyhedron object by defining a set of vertices and assigning them, with the vertex count, to a vhtVertexGeometry. The resulting polyhedron is then assigned to a vhtShape3D instance. For a simple unit cube, this is done in the following fashion:

```
vhtVertexGeometry *polyhedron
vhtShape3D       *object;
vhtVector3d      *vertices;
vertices= new vhtVector3d[8];
vertices[0][0]= 0.0; vertices[0][1]= 0.0; vertices[0][2]= 0.0;
vertices[1][0]= 1.0; vertices[1][1]= 0.0; vertices[1][2]= 0.0;
vertices[2][0]= 1.0; vertices[2][1]= 1.0; vertices[2][2]= 0.0;
vertices[3][0]= 0.0; vertices[3][1]= 1.0; vertices[3][2]= 0.0;
vertices[4][0]= 0.0; vertices[4][1]= 0.0; vertices[4][2]= 1.0;
vertices[5][0]= 1.0; vertices[5][1]= 0.0; vertices[5][2]= 1.0;
vertices[6][0]= 1.0; vertices[6][1]= 1.0; vertices[6][2]= 1.0;
vertices[7][0]= 0.0; vertices[7][1]= 1.0; vertices[7][2]= 1.0;
polyhedron = new vhtVertexGeometry( );
polyhedron->setVertices(vertices, 8);
object= new vhtShape3D(polyhedron);
```

To create the same cube, but this time using elementary shapes, you only need to specify the right geometry:

```
vhtVertexBox      *box;
vhtShape3D *object;
box= new vhtVertexBox(1.0, 1.0, 1.0);
object= new vhtShape3D(box);
```

Note that this procedure actually creates a geometry template for the collision engine your application will use. This will be discussed further in the section on collisions.

Using a NodeParser

Most applications will import scene graphs from data sets obtained elsewhere, rather than creating them from scratch. The VHT is equipped with a well-defined mechanism for handling such imports. The vhtNodeParser is an extensible class that defines the generic steps required to scan a graph of visual geometries and to reproduce an equivalent haptic scene graph.

The VHT also includes a parser that can import the popular CosmoCode scene graph (i.e. VRML). To transform a VRML scene graph into an haptic scene graph managed by the VHT, you need to first load the VRML file using Cosmo, create an instance of the vhtCosmoParser, and finally use the vhtEngine::registerVisualGraph method to take care of the transposal of the CosmoCode scene into the VHT environment. The following code does this for a VRML model of an airplane:

```
vhtCosmoParser cParser;
opGenLoader *loader;
csGroup *cosmoScene;
vhtDataNode *neutralNode;
loader = new opGenLoader(false, NULL, false);
cosmoScene= (csGroup *)loader->load("airplane");
theEngine->registerVisualGraph(cosmoScene, &cParser, neutralNode);
```

To import other kinds of scene graphs (e.g., 3D Studio Max→, SoftImage→), you will have to create a subclass of the vhtNodeParser that knows how to handle the details of a scene file. This procedure is explained in detail in the chapter on model import.

Adding Simulation Logic

The scope of the VHT does not cover the actual simulation of digital objects. The developer is responsible for creating his or her own digital environment. The role of the VHT is to make it easy to "hand enable" such simulations. However, the VHT does provide an expansion path which aims to aid the user with the implementation of simulation logic.

First of all, the VHT is equipped with a powerful collision detection engine (vhtCollisionEngine). Managed by the vhtEngine, this collision engine monitors the haptic scene graph and the virtual human hand, and detects any interpenetration between two given objects. Secondly, the vhtSimulation class is a stencil for providing logic to virtual objects. Finally, the exchange of information between virtual objects, visual representations and haptic states is organized by the data-neutral scene graph of the vhtEngine.

Subclassing vhtSimulation

For simple applications, the simulation logic is implemented by the method handleConstraints of a vhtSimulation subclass. This method is called by the vhtEngine after all attached devices have been updated, to analyse the current situation and take care of interaction between the objects.

As an example, we will create the simulation logic for a cube that spins on itself. It will be provided by the class UserSimulation, which has the following declaration:

```
#include <vhandtk/vhtSimulation.h>
class UserSimulation : public vhtSimulation
{
  protected:
    SimHand *demoCentral;
  public:
    UserSimulation(SimHand *aDemo);
    virtual void handleConstraints(void);
};
```

For the purpose of the example, it is assumed that the SimHand class has a the getCube method that provides a vhtTransformGroup instance containing the cubic shape. The implementation of handleConstraints is then only doing a one degree rotation of the cube transform:

```
UserSimulation::UserSimulation(SimHand *aDemo)
  : vhtSimulation( )
{
    // Record the root of all the information.
    demoCentral= aDemo;
    setHapticSceneGraph(aDemo->getSceneRoot( ));
}
void UserSimulation::handleConstraints(void)
{
    // Refresh all transforms
    aDemo->getSceneRoot( )->refresh( );
    // Rotate the cube about local X axis.
    vhtTransform3D xform = demoCentral->getCube( )->getTransform( );
    xform.rotX(M_PI/360.0);
    demoCentral->getCube( )->setTransform(xform);
}
```

To use the custom simulation, the vhtEngine would use the following lines during setup phase (rather than the one shown in the section Creating a Simulation Framework):
UserSimulation*userSim;
userSim=new UserSimulation( );
theEngine->useSimulation(userSim);

Handling Collisions

A substantial requirement of any interactive simulation is to recreate physical presence and to give virtual objects the ability to be more than mere graphical shapes. The goal is to have them move in digital space and react to the collisions that may occur. The collision detection engine is normally used by a subclass of vhtSimulation to detect these situations and then act upon them (during the handleConstraints phase). The following is only a brief overview of the collision detection capabilities of the VHT, and you should refer to the collision detection example in Chapter 8 to learn how to use it effectively.

The Collision Detection Engine

As you would expect, the class vhtCollisionEngine implements collision detection. A single instance needs to be created and used by the vhtSimulation instance. The simulation has very little work to do to get the vhtCollisionEngine up to speed. It simply needs to register the haptic scene graph with the vhtCollisionEngine instance, using the vhtCollisionEngine::setHapticSceneGraph method. After this, it can get the current collision status between objects by retrieving the collision list, as illustrated in the following section.

The Collision List

At any given moment during the simulation, the set of objects that are colliding is available through the vhtCollisionEngine::getCollisionList. This method returns a vhtArray instance, which is filled with vhtCollisionPair objects that represent collisions. The simulation logic can use this list in the following fashion:

```
vhtArray *collisionList;
vhtCollisionPair *currentPair;
unsigned int i, nbrCollisions;
collisionList = ourCollisionEngine->collisionCheck( );
nbrCollisions= collisionList->getNumEntries( );
for (i= 0; i < nbrCollisions; i++) {
    currentPair= (vhtCollisionPair *)collisionList->getEntry(i);
    ...custom reactions to the collision...
}
```

We assume in this code that an object of type vhtCollisionEngine has already been created and is referenced by the pointer ourCollisionEngine.

Updating the State of Objects

When programming a 3D simulation, a good portion of the work will involve updating the state of the virtual objects so that they behave in the desired manner. This includes behavioral updates as well as collision-response updates. The combination of these updates will lead to a desired graphical update. The changes that occur in the graph are very much dependant on the nature of the nodes. The following lines demonstrate a common situation where a vhtTransformGroup node is modified so that the underlying subgraph it contains is repositioned in space:
vhtTransformGroup*helicopter;
vhtTransform3D tmpPos;
tmpPos=helicopter->getTransform( );
tmpPos.translate(0.0, 2.0, 0.0);
helicopter->setTransform(tmpPos);
sceneRoot->refresh( );

Drawing the Scene

The previous sections have dealt with the more invisible parts of an application. We have now reached the point where it's time to actually start seeing the result of all those computations that take effect in the application. As for the simulation logic, the scope of the VHT doesn't cover 3D rendering. However, since it is such an important operation, the VHT does provide an expansion path for making it easy to draw virtual objects.

Refreshing from the Data Neutral Graph

During the execution of an application, the VHT will detect collisions and work in concert with the simulation logic to react to them, normally by at least displacing objects. For example, you can picture the haptic action of pushing a cube using the hand. This section describes how the information is transferred from the haptic scene graph into the visual scene graph, so that visual geometries move appropriately.

Yet another graph, the data neutral graph, will provide the glue between the two scene graphs. Typically, the data neutral graph is created as objects are imported and transferred into the haptic scene graph, as mentioned in the section Using a NodeParser. The data neutral scene graph mechanism is explained in Chapter 5.

The VHT holds any independent collidable object as a vhtComponent node of the haptic scene graph. In the simple case, the visual update is a simple matter of transferring the transformation matrices from the vhtComponent nodes into the equivalent nodes of the visual scene graph. This is valid if the visual objects don't have non-collidable mobile sub-elements (for example, a car which doesn't have spinning wheels).

The VHT facilitates that operation by keeping an optimized list of data neutral nodes which link the matching vhtComponent and visual instances. That list is accessed with the vhtEngine::getComponentUpdaters. The list is made of instances of vhtNodeHolder, which are simply convenient place holders for data neutral nodes. The method vhtNodeHolder::getData returns the actual data neutral node.

In the following code segment, the first element of the list of data neutral nodes associated with vhtComponents is queried. Then, a loop iterates through the elements of the list. At each iteration, it extracts the CosmoCode node and its vhtComponent equivalent (if any), and copies the transformation of the vhtComponent into the CosmoCode node's matrix, using the correct ordering of matrix elements. Note that this example is based on a utilization of the vhtCosmoParser class, which always create a map between vhtComponent and csTransform instances. For this reason, no class checking is implemented in the loop, but in general such a blind operation would be error-prone.

```
csMatrix4f fastXform;
vhtNodeHolder *updateCursor;
vhtCosmoNode *mapNode;
vhtComponent *xformGroup;
updateCursor= globalEngine->getComponentUpdaters( );
while (updateCursor != NULL) {
    mapNode= (vhtCosmoNode *)updateCursor->getData( );
    if ((xformGroup= (vhtComponent *)mapNode->getHaptic( )) !=
    NULL) {
        csTransform *transformNode;
        vhtTransform3D *xform;
        double scaling, matrix[4][4];
        unsigned int i;
        if ((transformNode= (csTransform *)mapNode->getCosmo( )) !=
        NULL) {
            xform= xformGroup->getLM( );
            xform.getTransform(matrix);
            fastXform.setCol(0, matrix[0][0], matrix[0][1], matrix[0][2],
            matrix[0][3] );
            fastXform.setCol(1, matrix[1][0], matrix[1][1], matrix[1][2],
            matrix[1][3] );
            fastXform.setCol(2, matrix[2][0], matrix[2][1], matrix[2][2],
            matrix[2][3] );
            fastXform.setCol(3, matrix[3][0], matrix[3][1], matrix[3][2],
            matrix[3][3]);
            transformNode->setMatrix(fastXform);
        }
    }
    updateCursor= updateCursor->getNext( );
}
```

Device Layer

The VHT device layer is included with all VTi hardware products. It contains a set of classes to facilitate access to input devices. These devices include CyberGlove, Cyber-Touch and CyberGrasp, as well as Polhemus and Ascension 6-DOF trackers. Since all direct hardware interaction is done by the Device Manager, instances of these classes provide a proxy representation of hardware devices. The proxy mode is distributed, so hardware may even be at remote locations and accessed via a TCP/IP network.

Addressing a Device's Proxy

The class vhtIOConn describes a single device connection. Each instance of the class vhtIOConn defines the address for specific piece of hardware. Thus an application that uses both glove and tracker data will define two instances of vhtIOConn, one that describes the glove and one that describes the tracker.

Most applications will build vhtIOConn objects by referring to predefined entries in the device registry, which is maintained by the DCU (see the VHS User's Guide for more details about the DCU). To access a default device defined in the registry, the application code will use the vhtIOConn::getDefault method. For example, the statement to get the glove proxy address using the registry defaults is:

vhtIOConn*gloveconn=vhtIOConn::getDefault(vhtIOConn::glove);

Similar calls provide addressing information for both the tracker and CyberGrasp proxies:

vhtIOConn*trackerConn=vhtIOConn::getDefault(vhtIOConn::tracker);
vhtIOConn*cybergraspConn=vhtIOConn::getDefault(vhtIOConn::grasp);

In and of itself, a vhtIOConn object does not actually create the proxy connection to the Device Manager. To do so, the particular device's proxy must be created using one of the Device classes.

Scene Graphs

To deal with geometrical information in a formal way, the VHT uses scene graphs that contain high-level descriptions of geometries. Scene graphs are widely used in computer graphics applications for representing geometric relationships between all the components in a scene. Popular examples of scene-graph-based API's include OpenInventor, Performer, OpenGL Optimizer and VRML97. Readers unfamiliar with scene graphs are encouraged to read texts covering some of the API's mentioned above.

Note that the VHT scene graphs are primarily oriented toward haptic and dynamic operations, rather than graphic rendering.

The information necessary to build a good representation of a virtual environment is quite complex, and requires a special flexibility in terms of geometrical and visual data management. Because of that, the VHT does not rely on a single scene graph to manage the virtual environment. Instead, it relies on a mapping, mechanism to link haptic and visual information while giving a maximum flexibility for developers to use the most appropriate scene description within their applications. This section discuss the Haptic Scene Graph and the Data Neutral Scene Graph of the VHT. The VHT scene graphs are also designed to release developers from constraining their own data structures in order to accommodate the VHT.

Haptic Scene Graph

The haptic scene graph is an organizational data structure used to store virtual environment information such as geometry, coordinate transformations and grouping properties, for the purpose of collision detection, haptic feedback and simulation. Each object in a scene, often referred to as a node, can be viewed as the composition of a number of geometric entities positioned in space according to a coordinate frame local to the object. In turn, each object has a coordinate transformation from the global frame that defines the basis of its local coordinate frame. The haptic scene graph includes facilities to transform positions expressed in a local coordinate frame to a global one, and for the exhaustive parsing of all elements in a formal order.

Finally, it should be noted that from a theoretical standpoint, the VHT haptic scene graph is a directed tree without cycles, rather than a general graph. This limitation might be removed in the future.

Fundamental Haptic Scene Graph Classes

From the above discussion, you can see that any useful scene graph will generally contain at least two types of nodes, namely transformation grouping nodes and geometric nodes. By organizing these two types of nodes into a tree-like data structure, we obtain a hierarchy of geometric transformations applied on atomic geometrical shapes. In the VHT, the vhtTransformGroup and vhtShape3D classes provide the basic set of scene graph nodes. The haptic scene graph can be constructed by inserting nodes one by one from method calls, or by using a model parser like the vhtCosmoParser.

A vhtTransformGroup instance is constructed either with a default transformation, or by passing a homogeneous transformation matrix into the constructor. In the VHT, homogeneous transformations are stored in vhtTransform3D instances. A vhtTransform3D object represents a three-dimensional coordinate transformation, including both arbitrary rotation and translation components.

Transformation instances contain two variables that each hold a type of homogeneous transformations. First, the variable vhtTransformGroup::LM (local matrix) contains a transformation from the local coordinate frame to the global frame (world). The global frame is defined as the frame at the root of the scene graph. Secondly, the variable vhtTransformGroup::transform contains a transformation from the local frame to the frame of the parent node. LM transformations are obtained by just pre-multiplying (i.e. right multiplication) all transforms found along a direct path from the root node to the transform group. The instance variables are accessed through the methods setLM/getLM and setTransform/getTransform respectively.

To create hierarchies of nodes, we need to be able to define the relationships between the nodes. This is accomplished with the help of the addChild(vhtNode*nPtr) method of the vhtTransformGroup class. To build a simple hierarchy with two levels, one of which is translated 10 units along the x axis, we could write:

```
vhtTransformGroup *root= new vhtTransformGroup( );
    // Define that node as the root node of the haptic graph.
root->setRoot( );
vhtTransform3D xform(10.0, 0.0, 0.0);
vhtTransformGroup *newFrame= new vhtTransformGroup(xform);
root->addChild(newFrame);
```

A haptic scene graph is permitted to have only one node defined as the root node. The root node is defined by calling the setRoot method on the chosen instance. Note that the root property is a singleton setting in the sense that each user application may have only one root node.

The haptic scene graph becomes interesting when it is populated with actual geometric objects. This is accomplished by adding nodes of the vhtShape3D class. A vhtShape3D instance is actually a geometry container, which is used to store different types of geometry. To better accommodate geometries expressed as NURBS, polygons, implicit definitions and so on, the vhtShape3D contains an instance variable that points to the actual geometric information. This allows users to define new geometries specific to their needs by class inheritance while still retaining all the benefits of the haptic scene graph.

As an example, consider making a cube with unit dimensions. The VHT provides a geometric convenience class called vhtVertexBox for making box-like objects. This class is one of a few elementary primitive shapes of the VHT available to the developer. Other shapes include:

vhtVertexSphere: defines a spheric geometry.
vhtVertexCone: defines a conic geometry.
vhtVertexCylinder: defines a cylindric geometry.

To build a box shape, we must set the geometry of a vhtShape3D object to our newly-created box. The code for this is:

```
vhtVertexBox *box = new vhtVertexBox( );    // Default size is 1X1X1.
vhtShape3D *boxShape = new vhtShape3D(box);
```

Figure 5:
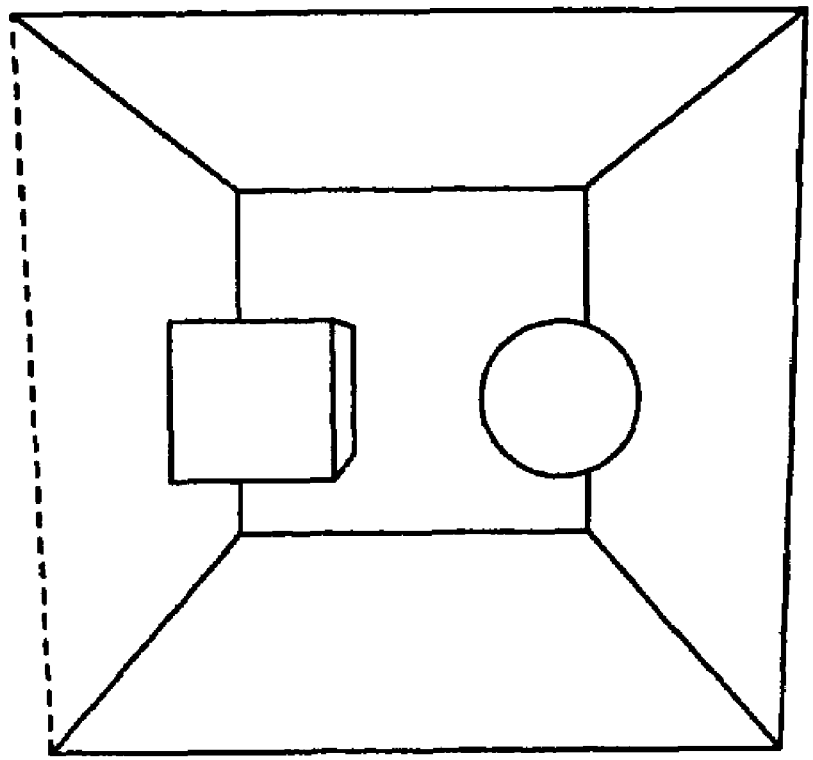
FIG. 5 is a diagrammatic illustration showing how software code would be represented as a scene graph and how it could be displayed on the screen (given a haptic to visual mapping) to show the relationship between a scene graph and it's representation on screen.
Figure 5:
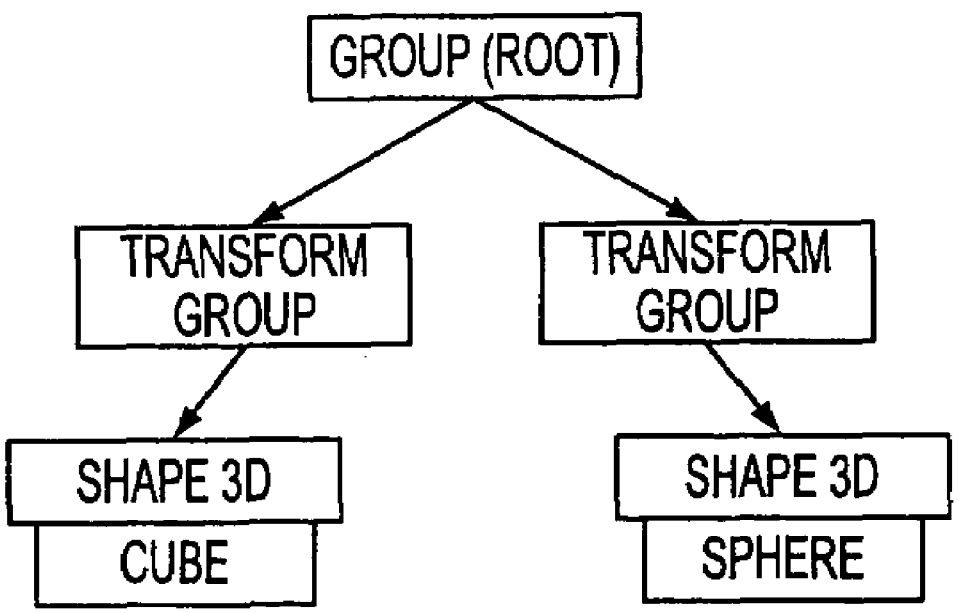

Similarly, one could create a sphere by writing:
vhtVertexSphere*sphere=new vhtVertexSphere( );
vhtShape3D*sphereShape=new vhtShape3D(sphere);

The VHT currently includes pre-defined classes only for convex vertex-based geometries. However, users are free to extend the geometry classes to suit their need. Once a vhtShape3D object has been created, it can be added as a child to a vhtTransformGroup node (a vhtShape3D can be the child of only one grouping node a the time). Thus to translate our unit cube 10 units in the x direction, we could reuse the vhtTransformGroup variable introduced in the previous code example as such:
newFrame->addChild(boxShape);

FIG. 5 shows pictorially how the above code would be represented as a scene graph and how it could be displayed on the screen (given a haptic to visual mapping) to show the relationship between a scene graph and it's representation on screen.

The children of a grouping node are kept in an ordered list, which can be queried with the getChild method.

As a closing note to this section, it should be noted that every type of node class of the VHT haptic scene graph is equipped with a render method. By invoking this method, you get a visual representation of the node sent into the current OpenGL context. For vhtShape3D nodes, the render method simply calls the render method of the first vhtGeometry that has been set. Since the VHT by default only includes support for vertex based geometries, this method will render a point cloud for each vhtShape3D. The geometry rendered can be manipulated by defining an appropriate vhtCollisionFactory framework. Note that if a user application uses the VClip interface, the rendered geometry will contain face information (i.e. solid shaded geometries).

For vhtTransformGroup objects, the render method will apply coordinate frame modifications to the GL_MODEL-VIEW stack. In addition, the render method will recursively call apply the render method to all children node contained in the grouping nodes. Thus for a haptic scene graph with a well-defined root, the application only needs to do the following to get a visual representation of the current haptic scene graph:
root->render( );

Updating the LM and Transform Values

In the previous section, the scene graph was not being modified after it has been constructed. But most user applications will require that objects in the virtual environment move in some manner. Since we have access to the transform of a vhtTransform3D node, it is fairly clear that we can just modify the coordinate frame of each geometry directly. Using the above code samples, we could add the following line to create motion:
newFrame->getTransform( ).translate(1.0, 0.0, 0.0);

That statement displaces the cube from its original position (10,0,0) to the point (11,0,0). If we do this in a loop that draws the haptic scene graph, once per frame, the cube will seem to move along the x-axis at a fairly high rate of speed. However, there is one detail that prevents this from working properly. The render method of all haptic scene graph nodes uses the node's LM matrix for OpenGL, which have to be synchronized with the changes caused to a node. In order to keep the transform and the LM in synch, it is necessary to call the refresh method. Refresh is a recursive method that works on all nodes in a subgraph so it needs only be called on the root node. Primarily, refresh will ensure that all LM's and transform matrices agree with each other. Thus we need to add one more statement to the previous one:
root->refresh( );

Exemplary Use of a Haptic Scene Graph

The reader may be somewhat confused at this point about what exactly a haptic scene graph should be used for. In the above discussion, it was shown how to construct a simple scene graph, how to render one and finally how to manipulate one in real time. From the point of view of the VHT, a haptic scene graph is primarily a collision data structure that describes the current state (position, orientation, geometry) of the shapes that constitute a scene.

In a typical user application, the haptic scene graph will be generated by some import mechanism (see Chapter 10), or some other algorithmic technique. Once this is done, a collision engine object will run over the scene graph and generate collision geometry for each vhtShape3D. Once this is done, the vhtSimulation component of the application will execute an update loop on the haptic scene, and the collision engine in tandem.

Seen from this point of view, the render method demonstrated above is primarily for debugging complex scenes in which the collision geometry needs to be rendered. We defer a detailed discussion of this framework to Chapter 8.

Haptic Scene Graphs—More Details

This section discusses some of the more advanced features of the haptic scene graph classes: generic grouping nodes, vhtComponent nodes and the human hand scene graph.

The vhtTransformGroup previously introduced is one type of grouping node offered by the VHT. The parent class of vhtTransformGroup is vhtGroup, which is also the superclass of all other grouping nodes. It provides generic child management methods such as numChildren, setChild and detachChild.

The method numChildren returns the number of immediate children that are in the group on which it was called (children of children are not taken in account). In the above sample code, the root node has one child. When a specific haptic scene graph layout is required and its position in the children list is known, the setChild method can be used to specify the child index for a new addition. This can be used instead of the addChild method. Note that the VHT does not impose any limitation on the way user applications can order children in a grouping node. In particular, it is possible to have a single child with an index of 10. This would mean that the first 9 children of the group would be empty slots (NULL pointers). In this case, a child that is added afterward with the addChild method will get the index value of 11.

Finally vhtGroup::detachChild is used to remove a child from the scene graph. It takes either a child index or a child object pointer as its argument, and cause the specified child to be removed from the scene graph. The nodes are not deleted, but the connection to the haptic scene graph is broken. This can be used to move subgraphs from one location to another in the scene graph.

The vhtSwitch node is a grouping node that has an "active child" property. During a haptic scene graph traversal, only the active child (if any) is used. This is useful for scene operations like varying level-of-detail, where a group node will have several versions of the same subgraph in varying resolutions. Depending on the user viewpoint, the best subgraph is chosen. This behavior is accessible through the methods currentChild and setWhichChild. The first method returns a vhtNode instance, which is the head of the active subgraph. The second takes a single integer argument that is the index of the desired active vhtNode.

The vhtComponent is yet another type of grouping node. It is intended as a convenient reference node for rigid objects composed of several vhtShape3D nodes. Most geometric modelling software builds geometries using some primitives that can be added together. The VHT supports this type of construction through the vhtComponent node. All children of a vhtComponent instance have fast pointers to the component. The pointers are accessed by using the getComponent method of the vhtNode class. The convenience of this type of object is in aggregate processing such as collision detection and hand-grasping algorithms.

The vhtComponent importance is shown in the light of collision detection. For now, note that by default, only vhtShape3D nodes that have different vhtComponent parents can be collided. For the moment, consider a simple example of constructing a geometry that resembles a barbell. It can be thought of as composed of three cylinders, a long thin one representing the bar and two short thick ones for the weights. By using the center of the bar as the local coordinate system, all three shapes can be vhtShape3D nodes (and their associated geometry). Now in an application the barbell might be spinning and flying (as barbells often do). By making the entire barbell nodes a subgraph of a vhtComponent instance, we need only update the transform of the component and refresh. The haptic scene graph will automatically treat all the children of the component as a rigid body and optimize the refresh action.

Data Neutral Scene Graph

The VHT's haptic scene graph is oriented toward other tasks than graphic rendering. Examples of the previous section have demonstrated the haptic scene graph features by eventually drawing its content; yet this was mostly done for the sake of pedagogy. In a user application, the rendering is most likely to use a different approach, oriented toward visual quality and the use of some drawing package. This is why the VHT provides an additional type of scene graph, called the Data Neutral Scene Graph.

The Data Neutral Scene Graph acts as a mapping mechanism between the Haptic Scene Graph and other information, typically a visual description of the scene on which the application works. Thus an application using the VHT is expected to contain in general three scene graphs: the visual graph, the haptic graph, and the data neutral graph that will map associated nodes from first two graphs.

The primary class used in the Data Neutral Scene Graph is vhtDataNode. It provides the basic graph management methods, and it can point to an associated node that belongs to the Haptic Scene Graph. Conversely, a node in the Haptic Scene Graph that has been associated by a vhtDataNode will point back to that instance, thus providing a mapping to some external information. The Data Neutral Scene Graph is a stencil for developing customized versions according to an application requirements.

The support for the CosmoCode rendering library is implemented in this very fashion. The VHT derives the vhtDataNode into a vhtCosmoNode class by supplying a placeholder for csNode instances. As the CosmoCode import filter provided by the class vhtCosmoParser traverses a CosmoCode scene graph, it creates instances of vhtCosmoNode, and links them with the corresponding dual instances of csNode and vhtNode. The vhtCosmoParser shows the simplicity of expanding the VHT to communicate with an external scene graph.

The VHT also provides a CosmoCode tree parser (vhtCosmoParser class), which traverses CosmoCode scene graph, created from VRML files. This parser descends the CosmoCode tree, creates a haptic node for each appropriate csNode, and finally creates instances of vhtCosmoNode that act as a bidirectional maps between the visual and haptic nodes. So for an application that imports and draws VRML files using CosmoCode, three scene graphs would be used: the CosmoCode scene graph for rendering, the haptic scene graph, for collision detection and force feedback, and finally the data neutral nodes to exchange modifications such as movements to either the visual or the haptic scenes.

The main features of the vhtDataNode are the getParent and getChildren methods, which return both a vhtDataNode instance. The children of a vhtDataNode are organized as a linked list, rather then an ordered list as in the haptic scene graph grouping nodes. This linked-list is browsed by using the getNext/getPrevious methods. Finally, the haptic node (a vhtNode object) associated with a data neutral node is defined and accessed with the setHaptic/getHaptic methods. All other functionality is subclass dependant.

In an application that makes use of the multi-threaded abilities of the VHT and links with an external scene graph or some other data structure, synchronous data integrity must be maintained explicitly. The VHT provides a locking mechanism that works in conjunction with the vhtSimulation class discussed below. This is accomplished by calling vhtNode::sceneGraphLock and then calling vhtNode::sceneGraphUnlock to unlock the graph. These calls are fairly expensive in terms of performance and data latency so locking should be centralized in user application code and used as sparingly as possible.

As an example of a situation where locking is required, consider a CosmoCode scene graph that is connected via a data neutral scene graph to a haptic scene graph. The haptic scene graph is updated by some vhtSimulation method that the user code has inherited. Once per graphic rendering frame, the LM matrices corresponding to all vhtComponent classes in the haptic scene graph need to update their corresponding nodes in the CosmoCode scene graph so that the visual matches the haptic. During this process, the vhtSimulation instance must be paused or blocked from updating the component nodes while they are being read or else the visual scene graph might display two superimposed haptic frames. In pseudo-code, this would be accomplished as following:

```
void graphicalRender(void)
{
    ...pre-processing...
    hapticRootNode->sceneGraphLock( );
        ...copy component LM matricies to CosmoCode...
    hapticRootNode->sceneGraphUnlock( );
        ...post-processing...
}
```

Human Hand Class

This section is devoted to the vhtHumanHand class and its uses. In the previous sections, we have mentioned the vhtHumanHand class in a number of places. This class is one of the largest and most complex in the VHT, providing integrated support for a CyberGlove, a tracker and a CyberGrasp. The human hand class manages all data updates, kinematic calculations, graphical updates and it can draw itself in any OpenGL context.

Human Hand Constructors

By having a vhtHumanHand instance in an user application, the CyberGlove and other device functionality is available for little or no work. The vhtHumanHand class has a large set of constructors. This variety is provided to allow maximum flexibility for user applications. The constructor arguments are all used to specify device objects that the vhtHumanHand object will use to get data from and to send data to.

The default constructor is defined as:
vhtHumanHand::vhtHumanHand(GHM::Handedness h=GHM::rightHand);

This instantiates an unconnected hand object that has the indicated handedness. By default, the handedness is right; a left handedness is obtained by providing the GHM::leftHand parameter to the constructor.

For users that have a CyberGlove and an associated 6 DOF tracking device, the following set of constructors will be more useful,

```
vhtHumanHand(vhtGlove *aGlove, vhtTracker *aTracker,
                               GHM::Handedness h=
                               GHM::rightHand);
vhtHumanHand(vhtHandMaster *aMaster, GHM::Handedness h=
    GHM::rightHand);
```

The first constructor instantiates a human hand with the provided glove and tracker objects. These device objects should be connected to their respective hardware before being used in this constructor. It is possible to use glove or tracker emulators in place of an actual device's proxy. The second constructor uses the vhtHandMaster object, which is simply a storage mechanism for a glove and tracker pair.

For users that also have a CyberGrasp system, the following pair of constructors will be used:

```
vhtHumanHand(vhtGlove *aGlove, vhtTracker *aTracker,
        vhtCyberGrasp *aGrasp, GHM::Handedness      h=
GHM::rightHand);
vhtHumanHand(vhtHandMaster *aMaster, vhtCyberGrasp *aGrasp,
                GHM::Handedness                     h=
GHM::rightHand);
```

These two constructors are only different to the two previous constructors by the addition of a vhtCyberGrasp parameter.

Hand Device Management

Once the application has instantiated a vhtHumanHand, the supplied device's proxies will be controlled and updated as required by the instance. At any time, the user application can extract the device's proxies in use by the vhtHumanHand. by invoking the methods getHandMaster and getCyberGrasp. The vhtHumanHand also contains an update method, which will refresh the proxies states with the latest hardware values for all attached devices (by calling their respective update methods).

All connected hardware devices managed by the vhtHumanHand may be disconnected with the disconnect method. This method calls the associated disconnect methods of each attached device.

Hand Kinematics

The human hand class includes a complete kinematic model of a human hand (right or left hand). This model provides a mapping from the glove and tracker data into a hierarchy of homogeneous transformations representing the kinematic chain of each finger.

The hand kinematics are automatically updated when the vhtHumanHand::update method is called. The kinematics calculation unit may be accessed with a call to vhtHumanHand::getKinematics, which returns the vhtKinematics used by the hand.

The vhtKinematics class provides a number of important methods for users who wish to integrate hands into their own applications. Many users will want to extract the position and orientation of each finger element. This can be accomplished with the vhtKinematics::getKinematics method. This method takes a finger and joint specifier (from the GHM) and returns the current vhtTransform3D object, as a reference.

Hand Scene Graph

The vhtHumanHand class has an internal representation of a hand as a haptic scene graph. This scene graph can be manipulated just like any other haptic scene graph (see Chapter 5). Access to the root node of this scene graph is provided by the getHapticRoot method. This method returns a pointer to a vhtGroup instance, whose children represent the chains of finger segments and the palm.

The hand haptic scene graph will need periodic calls to refresh its internal subgraph to keep it in synch with the application global haptic scene graph. These calls are performed automatically when then vhtHumanHand is registered with the vhtEngine. In order for this to take place, each hand must be registered with the active engine object using the vhtEngine::registerHand method. Hand registration also takes care of adding the hand scene graph to the current haptic scene graph root node, as a child.

The hand haptic scene graph is organized into six subgraphs, one for each finger starting with the thumb and one for the palm. Each finger is stored in an extension of the vhtGroup class, called vhtHumanFinger. Instances of this class contain pointers to each of the three phalanges, the metacarpal, the proximal and the distal. An individual phalanx may be accessed via the method vhtHumanFinger::getPhalanx.

The vhtPhalanx class is derived from the vhtTransformGroup class. Each phalanx has a child that is a vhtShape3D and which contains the geometry representing that phalanx. Note that the geometry stored in the phalanx class is not the geometry that is drawn on the screen, but rather an optimized geometry used for collision detection in the VHT.

Both the finger and phalanx classes provide pointers back to the vhtHumanHand class that contains them. This can be very useful in collision detection, when only the vhtShape3D is returned from the collision engine. Chapter 8: Collision Detection, gives an example that uses this access technique.

Visual Hand Geometry

The vhtHumanHand class is equipped with a visual geometry that can draw itself in an OpenGL context. The visual geometry is accessible through getVisualGeometry and setVisualGeometry access methods, which return and set a vhtHandGeometry instance.

Once the user has an active OpenGL context and an active vhtHumanHand class it is very simple to draw the current hand configuration. The first step is to allocate a vhtOglDrawer object. This object knows how to traverse and draw the vhtHandGeometry class. During the rendering loop, the method vhtOglDrawer::renderHand should be called to draw the current hand configuration. The first argument to this method is the current camera transformation, as represented by a vhtTransform3D object, and the second argument is the hand to be drawn. An example to accomplish this is:

```
void init( )
{
    ... some init code ...
    drawer = new vhtOglDrawer( );
    cameraXForm= new vhtTransform3D( );
    ... some more init code ...
}
void renderCallback(void)
{
    ... some render code ...
    drawer->renderHand( cameraXForm, hand );
    ... some more render code ...
}
```

CyberGrasp Management

This section introduces the VHT's support for the CyberGrasp force feedback device.

If the CyberGrasp is used by an application to 'feel' virtual objects, the use of the impedance mode will achieve the best performance. This mode runs a control law on the Force Control Unit (FCU) at 1000 Hz to control the force feedback. In this mode, the VHT uses objects of type vhtContactPatch to supply the dedicated hardware unit with predictive information about the physical environment simulated by the application.

A vhtContactPatch instance represents a tangent plane approximation to the surface of the virtual object which is touched by a particular finger. Contact patches can be constructed in a variety of ways, depending on the user application.

When the vhtHumanHand::update method is invoked, a query is done for each finger in the haptic graph to determine if a contact patch has been set. If there are any fresh patches, they are sent over to the controller. Although each finger has 3 phalanges, and each phalanx allows a separate contact patch, the CyberGrasp device has only one degree of freedom per finger. For this reason, the 'best' patch is chosen for each finger as the closest patch to the distal joint. For example, if two patches are set on the index finger, one for the metacarpal and one for the distal, only the distal patch will be sent to the controller.

After each call to vhtHumanHand::update, the patches on all phalanx are reset. In order to continue to 'feel' an object, a new set of patches will have to be set before the next call to the update method.

Grasping Virtual Objects

Once an application has constructed a vhtHumanHand object, a scene graph and a collision mechanism, the VHT provides a mechanism for allowing vhtComponent objects to attach themselves to the virtual hand. This procedure is more commonly known as 'grasping'.

Each vhtComponent has a method getGraspManager that returns an object of type vhtGraspStateManager. The grasp state manager encapsulates an algorithm for allowing scene components to be automatically 'picked up' by a virtual hand. The basic idea is that when a virtual hand collides with a vhtComponent graph, each hand part (phalanx, palm) generates some collision information, including the surface normal at the collision point. If these contact normals provide sufficient friction, the component will be attached to the hand.

Although the algorithm is somewhat complex, in practice, using this feature is very simple. The included demo simgrasping illustrates the procedure. We include the relevant handleConstraints method from the demo here:

```
void UserSimulation::handleConstraints(void)
{
    // This method will look at all ongoing collisions, sort the collisions
    // that occur between fingers and other objects, and generate patches for
    // the grasp to create the right forces at the user's fingers.
    // Get the list of all collision pairs.
```

-continued

```
demoCentral->getSceneRoot( )->refresh( );
// first constrain grasped objects
demoCentral->getCube( )->getGraspManager( )->constrain( );
// reset grasp state machine
demoCentral->getCube( )->getGraspManager( )->reset( );
vhtArray *pairList = collisionEngine->collisionCheck( );
    if ( pairList->getNumEntries( ) > 0 ) {
        vhtCollisionPair *pair;
      vhtShape3D *obj1;
        vhtShape3D *obj2;
        vhtShape3D *objectNode;
        vhtShape3D *handNode;
        vhtPhalanx *phalanx;
        vhtVector3d wpObj, wpHand;
        vhtVector3d normal;
        vhtTransform3D xform;
        //
        // Gor each collision,
        //  1) if it is hand-object we check for grasping,
        //  2) if it is obj-obj we add to assembly list.
        //
        //
        // Loop over all collisions, handling each one.
        //
        for ( int i= 0; i < pairList->getNumEntries( ); i++ ) {
            // Get a pair of colliding objects.
            pair = (vhtCollisionPair *)pairList->getEntry( i );
            //
            // Get the colliding objects.
            //
            obj1 = pair->getObject1( );
            obj2 = pair->getObject2( );
            //
            // Look only for hand-object collisions.
            int obj1Type = obj1->getPhysicalAttributes( )->getType( );
            int obj2Type = obj2->getPhysicalAttributes( )->getType( );
            //
            // External (hand) object collision.
            //
            if ((obj1Type == vhtPhysicalAttributes::humanHand
&& obj2Type == vhtPhysicalAttributes::dynamic)
                || (obj1Type == vhtPhysicalAttributes::dynamic
                    && obj2Type == vhtPhysicalAttributes::humanHand)) {
                    //
                    // For hand shapes, isDynamic( ) == false.
                    //
                if ( obj1->getPhysicalAttributes( )->isDynamic( ) ) {
                    wpObj = pair->getWitness1( );
                    wpHand = pair->getWitness2( );
                    objectNode = obj1;
                    handNode = obj2;
                    normal = pair->getContactNormal1( );
                }
                else {
                    wpObj = pair->getWitness2( );
                    wpHand = pair->getWitness1( );
                    objectNode = obj2;
                    handNode = obj1;
                    normal = pair->getContactNormal2( );
                }
                phalanx = (vhtPhalanx *)handNode->getParent( );
                //
                // set object grasping, using fingertips (distal joints) only
                //
                if( phalanx->getJointType( ) == GHM::distal ) {
                    if( pair->getLastMTD( ) < .2 ) {
                        objectNode->getComponent( )->getGraspManager( )->
addPhalanxNormal( normal, phalanx );
                    }
                }
...
}
```

There are three significant parts to this code segment. The second and third lines of code in this method call the vhtGraspStateManager::constrain( ) and vhtGraspStateManager::reset( ) methods respectively. The constrain method tells the state manager to enforce the current grasping state.

This means that if the normal conditions are sufficient, the component will be fixed relative to the virtual hand. The second method resets the cached collision information in the state manager. The purpose of this is to allow components to be released from a grasped state. If there are no collision reports after a reset call, the next constrain call will result in the component being released.

After this, there is some code to extract the collision events for the current frame. It is important to see that we isolate all collisions between a hand and any other scene component. Once this is done, the last code segment sets the phalanx and normal for the current collision event with the vhtGraspStateManager::addPhalanxNormal( ) method. Calls to this method cache the normal and phalanx information to allow a call to constrain to determine if the component should be grasped.

An additional trick has been added is to make object grasping particularly easy, contact normals are set for all MTD's less that 0.2. This means that even if the fingers are not touching the object (they could be 2 mm away), the grasping algorithm is invoked. For more exact grasping, this threshold should be less than or equal to zero.

One-Fingered Grasping

In some situations, it is useful to allow components to be constrained to a single phalanx. The vhtGraspStateManager facilitates this with the setUseGraspOneState method. When this is enabled, any single point contact (from addPhalanxNormal) will result in the component being constrained to that hand part. It is the responsibility of the user application to release the component (via a reset call).

Ghost Hand Support

In a virtual environment, one of the most psychologically disturbing events is watching as a virtual hand passes right through a virtual object in the scene. The human brain rejects this type of event strongly enough that it reduces the suspension of disbelief most applications of this type are trying to achieve. For this reason, the VHT includes support for a ghost hand algorithm that attempts to prevent such interpenetrations.

The ghost hand algorithm works by trying to find a vector that can be added to the current tracker position that will place the hand outside of all objects in the scene. This algorithm also has a coherence property, in that the hand should move the minimum amount from the previous frame to achieve this non-penetration. Thus moving the virtual hand down through a virtual cube will result in the graphical hand remaining on top of the cube.

In the situation where the graphical hand has been constrained by the ghosting algorithm, a non-zero offset vector exists that is added to the tracker. Once the physical hand moves in a direction away from contact, the graphical hand will try to converge this offset vector to zero by a small increment each frame (this is controlled by the get/setConvergenceRate method).

In practice, the ghost hand algorithm performs well; however it may be noted that the algorithm may generally degrade with decreasing haptic fame rate.

This functionality is encapsulated in a subclass of the vhtHumanHand called vhtGhostHumanHand. Objects of this class can be constructed exactly as a regular vhtHumanHand, and in fact behave in exactly the same way most of the time. However, there is one additional method, vhtGhostHumanHand::setContactPair( ). In practice, the user application simply needs to tell the ghost hand about all the collision pairs caused by hand-scene collisions. The update method will take care of the graphical constraint calculations.

Haptic Simulations

Applications that use the VHT for hand-based interaction or haptic scene graph simulation are most likely to have a similar program structure. In most cases, at the beginning of each frame, the most recent data is obtained from all external hardware devices, then the haptic scene graph is updated, and then user processing is performed based on the fresh data. The VHT source code segments presented in previous example have such structure. In each case, the user action is to render the scene or the hand. The VHT contains a formalized set of classes that encapsulate such a haptic simulation.

The front-end class for haptic simulation is vhtEngine. In an application, a single instance is used to register and to manage all hands in a scene, the scene graph, and allow for importing arbitrary scene graphs. The vhtEngine class also uses multi-threading to update all of its members without the intervention from the user application. User applications simply have to set any vhtHumanHand using the registerHand method (there is currently a limit of 4 hands that can be registered simultaneously). The scene graph to manage is set with the method setHapticSceneGraph. Once these two parameters have been defined, the engine can be started. For example:

```
vhtHumanHand *hand= new vhtHumanHand(master);
vhtGroup *root= buildUserSceneGraph( );
vhtEngine *engine= new vhtEngine( );
engine->setHapticSceneGraph(root);
engine->registerHand(hand);
// run the haptic thread
engine->start( );
... do other processing ...
```

Invoking the start method spawns the multi-threaded management of the vhtEngine, which is also referred to as the haptic simulation. While a haptic simulation is running, any of the nodes in the scene graph can be queried or changed as well as any aspect of the registered hands. As mentioned in the previous section, due to the multi-threading nature of haptic simulations, all scene graph nodes should be locked during data reads and/or writes.

The above framework enables user applications to easily query data from a running haptic simulation. This can be useful for graphical rendering or for telerobotic applications. However it may be necessary to have a smaller grain synchronization between the application and each update loop of the simulation. For this the VHT provides the vhtSimulation class. A vhtEngine instance invokes the dissimulation method of an associated vhtSimulation object once per frame. By extending vhtSimulation class, user applications can insert arbitrary processing into the haptic simulation. The method vhtEngine::useSimulation is used to set the user-defined vhtSimulation object.

By default, the vhtSimulation::doSimulation method:performs the scene graph refresh and hand updates. Before the scene graph is locked by the vhtSimulation, the method preLockProcess is called. After all external data is updated, but while the scene graph is locked, the method handleConstraints is called. After the scene graph is unlocked, postLockProcess is called. It is only necessary to inherit those methods that the user application actually needs to call. For many applications this will either be none or just handleConstraints. The three methods, preLockProcess, handleConstraints and postLockProcess do no action in the library provided vhtSimulation. Users are encouraged to subclass and use these entry points.

We conclude this section with an example that reworks the previous spinning cube demo into the vhtSimulation framework. In addition, we add a human hand and demonstrate the use of locking to draw the current state of the haptic scene graph using OpenGL.

Collision Detection

The determination of contact between two virtual graphical objects constitutes the field of collision detection. Contact information can take many forms, some applications only require boolean knowledge of collisions whereas others need detailed contact parameters such as surface normals and penetration depths. The VHT collision mechanism supports all of these requirements by providing a modular interface structure. In this framework, users may customize the collision detection to any desired degree.

Collision detection algorithms are almost always the primary source of performance degradation in applications that check for collisions. For this reason, the VHT system consists of several layers of optimized techniques to ensure the highest possible performance. The collision detection process can be divided into two steps: wide mode followed by local mode.

In wide mode, an algorithm tries to reduce the large number of possible collision pairs to the smallest possible set. The VHT collision system uses a number of techniques to globally cull all possible collision pairs to a smaller set of probable collision pairs. The algorithm does this in a conservative manner so that collisions are never missed.

In local mode, also known as pair-wise collision detection, two shapes are compared at the actual geometry level to determine detailed contact information. Information such as contact normals, closest points, etc. is calculated. VHT includes support for two implementations of an algorithm known as GJK (for Gilbert-Johnson-Keethri) for performing these computations.

Figure 6:
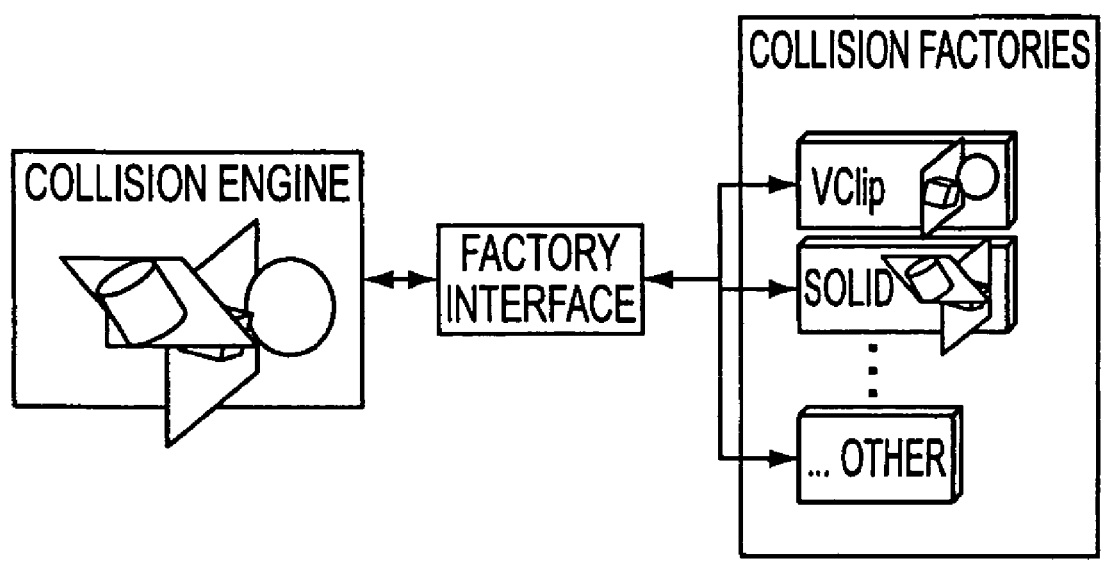
FIG. 6 is a diagrammatic illustration showing an overview of an exemplary embodiment of a collision engine structure.

The collision framework also provides for user customization of the entire local mode process. This modularity allows for the creation of high performance collision modules specialized for each user application. An overview of the collision engine structure is presented in FIG. 6.

The management of collision geometries, wide mode and other collision processing is handled internally in the vhtCollisionEngine class. An object of type vhtCollisionEngine is constructed by specifying a haptic scene graph and a collision factory to use. This chapter contains an overview of the factory and engine construction and use.

The Collision Factory

In the VHT, a collision framework is a pair of objects, a vhtCollisionEngine and an associated vhtCollisionFactory. The collision engine operates on data that are produced by its collision factory. However the vhtCollisionFactory class is an interface class (pure virtual) that sub-classes must implement.

The two virtual methods in the vhtCollisionFactory are:

```
vhtCollisionPair   *generateCollisionPair( vhtShape3D &obj1,
vhtShape3D &obj2 );
vhtGeometry        *generateCollisionGeometry( vhtShape3D &obj );
```

The first method determines if two vhtShape3D nodes can collide, and if so, generates an appropriate vhtCollisionPair object. The second method analyzes the geometry template stored in the vhtShape3D node and generates an optimized collision geometry representation.

The VHT includes an implementation of these two methods for two popular GJK implementations, VClip (from MERL, www.merl.com) and SOLID (www.win.tue.nl/cs/tt/gino/solid). These interfaces are included in separate libraries from the core VHT.

To use the VClip implementation, simply include the vclip factory class definition in the source code:
include <vhtPlugin/vhtVClipCollisionFactory.h>

Once included, it is simple to construct a VClip factory:
vhtVClipCollisionFactory*cFactory=new vhtVClipCollisionFactory( );

For SOLID, the associated code fragment is:
include<solid/solidCollisionFactory.h>
SolidCollisionFactory*cFactory=new SolidCollisionFactory( );

The Collision Engine

The primary point of access for collision detection is the class vhtCollisionEngine. This class manages all collision-related data structures and performs the hierarchical culling of all geometry pairs in the scene graph. The user application only has to specify the scene graph on which they want collision information, and an associated factory:
vhtCollisionEngine*collision Engine=new vhtCollisionEngine(root, cFactory);

This constructor will automatically build all the required data structures for collision detection. This procedure uses the associated factory extensively to generate pairs and collision geometry. After this constructor, all vhtShape3D nodes in the scene graph will contain collision geometry in a format compatible with the factory collider. Once the engine is constructed, it is simple to extract the list of proximal object pairs:

```
vhtArray *pairList = collisionEngine->collisionCheck( );
vhtCollisionPair *collisionPair;
for( unsigned int i=0; i < pairList->getNumEntries( ); i++ ) {
    collisionPair = (vhtCollisionPair *)pairList->getEntry(i)
    ... process collision event....
}
```

The list of pairs produced by this call will include all vhtShape3D nodes in the scene graph that are within collision epsilon distance of each other. This value can be accessed with the get/set methods:
collisionEngine->setCollisionEpsilon(10.0);
double eps=collisionEngine->getCollisionEpsilon( );

The collision engine class assumes that the haptic scene graph used in the constructor is static, in the sense that no subgraphs are added or deleted. If the application removes or adds nodes to the haptic scene graph, the vhtCollisionEngine::regenerateDataStructures method should be called, as in the following example:
deleteSomeNodes(root);
collisionEngine->regenerateDataStructures( );

Collision Pairs

The vhtCollisionPair class contains detailed information on the collision state of two vhtShape3D nodes. The collision pair object is constructed using the factory associated with the collision engine, and is returned after collision checking.

In the current framework, in order for a collision pair to be constructed, both vhtShape3D objects must: have valid collision geometry, have compatible attributes (see below), have vhtComponent parents, and be children of different components.

Every vhtShape3D object contains a vhtPhysicalAttributes member which is used to prune possible collision pairs. There are four types of attributes:
vhtExternalAttributes,
vhtDynamicAttributes,
vhtHumanHandAttributes,
vhtNonDynamicAttributes.

Scene graph objects that are driven by some external sensors, should have vhtExternalAttributes. The vhtHumanHandAttributes type is provided as a specialization of external attributes. Only vhtShape3D's associated with vhtHumanHand instances have this type of attribute. Objects that move in some manner during the simulation but not from external data sources should have vhtDynamicAttributes, and objects that do not move during the simulation (i.e. walls) should have vhtNonDynamicAttributes. By default, all vhtShape3D objects have vhtDynamicAttributes, and all hand related objects (i.e. vhtPhalanx) have vhtExternalAttributes.

Physical attributes can be set using the vhtShape3D::setPhysicalAttributes method. The collision allowances for each possible pair are shown in the table below.

|  | HumanHand | External | Dynamic | Non-Dynamic |
|---|---|---|---|---|
| HumanHand | No | No | Yes | No |
| External | — | No | Yes | No |
| Dynamic | — | — | Yes | Yes |
| Non-Dynamic | — | — | — | No |

Collision Reporting

Given the collision framework presented above, the user application is now faced with an array of vhtCollisionPair objects that describe the proximity state of the current haptic scene graph. In the VHS, it is the responsibility of the user application to decide how the collision pair list is processed. For this purpose, the vhtCollisionPair class contains a significant amount of information about the two shapes and their collision state. In this section, the vhtCollisionPair class is reviewed.

The two vhtShape3D nodes can be obtained from the methods getObject1 and getObject2. The current distance between the two objects is obtained from
double dist=collisionPair->getLastMTD( ).

This method returns a signed double value that is the minimum translation distance (MTD) between object 1 and object2. The MTD is the smallest distance that one object must be translated so that the two objects just touch. For non-penetrating objects, it is the same as their closest distance, but for penetrating objects it gives the deepest penetration depth.

The collider may be executed by the user application directly by calling getMTD. This method invokes the collider associated with the collision pair and updates all collision information.

Other information available from the vhtCollisionPair structure are the points, in each objects coordinate frame, on the surface that are closest. These are known as witness points and are returned by getWitness1, and getWitness2:
vhtVector3d witness1=collisionPair->getWitness1( );
vhtVector3d witness2=collisionPair->getWitness2( );

The surface normal at the witness point (in each object's frame) is given by getContactNormal1 and getContactNormal2:
vhtVector3d normal1=collisionPair->getContactNormal1( );
vhtVector3d normal2=collisionPair->getContactNormal2( );

Given both the witness point and the contact normal, a unique tangent plane to the surface of each object can be constructed. This can be useful for haptic-feedback applications involving devices such as the CyberGrasp or CyberTouch.

Typical user applications would like to have the witness points and contact normals in the world frame so that they can be compared or manipulated. This is simply accomplished by transforming the witness points and rotating the normals:

vhtVector3d worldWitness1=witness1;
collisionPair->getObject1( )->getLM( ).transform(worldWitness1);
vhtVector3d worldNormal1=normal1;
collisionPair->getObject1( )->getLM( ).rotate(worldNormal1);

Collision Detection Example

Collision detection is an example of a user process where one would like to be in synchronization with the haptic simulation frame rate. For this reason, it is common to write a vhtSimulation subclass that overrides the handleConstraints method and performs collision detection and collision response. We present a complete example of a hand touching an object below. The purpose of this section is to describe the collision detection and response layout.

The class SimGrasp is similar to the SixHand class. As before, the UserSimulation class is inherited from vhtSimulation. In this case however, the UserSimulation instance actually checks the results of the collision detection algorithm. The haptic scene graph consists of a single object and a hand, so all collisions will be object-hand. The algorithm finds the appropriate normal and offset for a tangent plane on the surface of the object for each detected contact. These tangent planes are used to provide force-feedback information to an attached CyberGrasp controller.

In the code the method handleConstraints contains the collision response code:

```
void UserSimulation::handleConstraints(void)
{
```

Before any collision checks can occur, the scene graph should be refreshed to ensure all transformation matrices are correct, as follows:

demoCentral->getSceneRoot( )->refresh( );

Check for collisions, and determine if there are any.

```
vhtArray *pairList = collisionEngine->collisionCheck( );
if ( pairList->getNumEntries( ) > 0 ) {
    vhtCollisionPair *pair;
    vhtShape3D *obj1;
    vhtShape3D *obj2;
    vhtShape3D *objectNode;
    vhtShape3D *handNode;
    vhtPhalanx *phalanx;
    vhtVector3d wpObj, wpHand;
    vhtVector3d normal;
    vhtTransform3D xform;
```

Loop over all the collision pairs, extracting and processing each one immediately.

```
for ( int i= 0; i < pairList->getNumEntries( ); i++ ) {
    vhtVector3d wpObj, wpHand;
    vhtVector3d normal;
    vhtTransform3D xform;
    // Get a pair of colliding objects.
    pair = (vhtCollisionPair *)pairList->getEntry( i );
```

Extract the two colliding shapes:

```
// Get the colliding objects.
obj1 = pair->getObject1( );
obj2 = pair->getObject2( );
```

Determine which one of the shapes is a hand and which one is dynamic. In each case, extract the witness points, and the contact normal for the dynamic shape.

```
if ( obj1->getPhysicalAttributes( )->isDynamic( ) ) {
    wpObj = pair->getWitness1( );
    wpHand = pair->getWitness2( );
    objectNode = obj1;
    handNode = obj2;
    normal = pair->getContactNormal1( );
}
else {
    wpObj = pair->getWitness2( );
    wpHand = pair->getWitness1( );
    objectNode = obj2;
    handNode = obj1;
    normal = pair->getContactNormal2( );
}
```

Respond to the collision. In this case, the collision information is used to generate a vhtContactPatch object that can be sent to the CyberGrasp device.

```
// Get the phalanx of the colliding tip.
phalanx = (vhtPhalanx *)handNode->getParent( );
// Set the contact patches for the distal joints, to activate CyberGrasp.
if ( phalanx->getJointType( ) == GHM::distal ) {
```

Transform the normal and witness point to world frame.

```
            xform = objectNode->getLM( );
            xform.transform( wpObj );
            xform.rotate( normal );
            // Create the contact patch, define its parameters.
            vhtContactPatch patch( wpObj, normal );
            patch.setDistance( pair->getLastMTD( ) );
            patch.setStiffness( .5 );
            patch.setDamping( .5 );
            phalanx->setContactPatch( &patch );
        }
    }
}
```

This method represents a typical collision handling scenario. The basic purpose of this code is to parse the collision list and for each distal joint collision event encountered, send an appropriate message to the connected CyberGrasp force feedback device.

The first thing this code does is retrieve the current collision list and check to see if there are any collisions reported.

For each collision event the code extracts the vhtCollisionPair object which corresponds to two objects in collision proximity. See the Programmer's Reference Manual for a full description of this class' functionality.

The next step is to determine which two objects are colliding. This code example uses the fact that all hand-related shape nodes have external attributes. By checking each object in the pair for this property, we can determine which one is a hand node and which one is an object. From this, we use the fact that all hand shape nodes are children of a phalanx (including the palm) to retrieve the hand object.

This portion of the code completes the collision detection phase. Once the colliding objects have been identified, the code moves into the collision response phase. In this example the response will be just to construct and send a contact patch to the CyberGrasp controller unit corresponding to the surface of the object being touched.

Contact patches are tangent plane representations of the surface of objects. These tangent planes are specified in world coordinates. Using rotate instead of transform preserves the unit length character of normal vectors. By updating the contact patches sent to the grasp controller on every haptic frame, it is possible to feel the surface of complex geometric objects. Somewhat by way of summary, the collision framework provided by the VHS consists of two primary components, a collision factory and a collision engine. Once these two pieces have been constructed and associated with a haptic scene graph, a single engine method provides a list of collision pairs. User applications are then free to use any or all of the provided information to construct their own response. In conjunction with the VHS hand class, it is straightforward to implement grasping and ghost hand behavior.

Model Import

The VHS programming framework is structured so that it is very simple to integrate into 3rd party rendering or visualization environments. In this chapter, the mechanism by which scene graphs can be imported from an arbitrary data structure (or file) is discussed. Once a scene graph has been imported into the VHS, there is a mechanism for synchronizing the position and orientation of all shapes in the scene very rapidly. This mechanism is also discussed.

The VHS ships with an associated library VHTCosmo that provides an interface to the Cosmo/Optimizer SDK. This will be the basis of the description in this section.

The fundamental structure behind scene graph import and synchronization is a structure known as the neutral scene graph (NSG). The NSG provides a (non-bijective) mapping between any external scene graphs nodes and the VHT scene graph nodes. The NSG is non-bijective in the sense that there does not need to be an exact 1-1 correspondence between every node (although in practice this will usually be the case).

The external interface consists of the following steps:

Subclass a new neutral node type.

Implement a node parser.

Import a scene graph.

Use the vhtEngine::getComponentUpdaters mechanism to synchronize.

Neutral Scene Graph

The NSG is a graph of nodes of type vhtDataNode. The base class has all the functionality necessary to manipulate and construct a simple graph. For the purpose of model import, a subclass of the vhtDataNode must be constructed so that a pointer to the 3rd party graph (3PG) is available. For Cosmo/Optimizer, this is simple:

```
//: A neutral cosmo node pointer.
// An implementation of the neutral scene graph specialized for
// the Cosmo/Optimizer rendering infrastructure.
class vhtCosmoNode : public vhtDataNode {
  protected:
    csNode *cosmoDual;
    //: Cosmo node dual to this.
```

```
public:
    vhtCosmoNode(void);
    //: Construct a null neutral node.
    vhtCosmoNode(vhtDataNode *aParent);
    //: Construct a node with given parent.
    //!param: aParent – Parent node.
    virtual ~vhtCosmoNode(void);
    //: Destruct.
    inline csNode *getCosmo(void) { return cosmoDual; }
    //: Get the associated cosmo node.
    inline void setCosmo(csNode *aCosmo) { cosmoDual= aCosmo; }
    //: Set the associated cosmo node.
    //!param: aCosmo – Associated cosmo node.
};
```

The resulting neutral node simply adds the storage of a csNode, the base class for all node types in Cosmo. This class is an easily modifiable template for supporting other scene graph types.

Node Parser

The node parser mechanism is an abstract interface for copying a tree. The basic technique for tree copying involves a depth first traversal and a stack. Since Cosmo is easily amenable to this approach, only this technique will be discussed, however, the approach will have to be modified for other 3rd party data structures that differ significantly from Cosmo.

First, the abstract interface for the vhtNodeParser:

```
class vhtNodeParser {
  public:
    enum ParseFlags {
        ready, finished, aborted
    };
    //: The states of a parser.
    enum ParseResult {
        prContinue, prAbort, prRetry, prFinished
    };
    //: Operation states that occur during the descent.
  protected:
    ParseFlags status;
  public:
    vhtNodeParser(void);
    virtual ~vhtNodeParser(void);
    virtual vhtDataNode *parse(void *aNode);
    virtual void *preProcess(void *someData);
    virtual vhtDataNode *postProcess(void *someData,
        vhtDataNode *aTree);
    virtual vhtDataNode *descend(void *someData)= 0;
};
```

To initiate parsing of a 3rd party scene, the method parse will be called. The parse method first calls result1=preprocess (aNode), then result2 =descend(aNode) and finally result=postProcess(result1, result2). The final variable result is returned. For most standard parsers, only the descend method needs to be implemented. This is the approach taken by the vhtCosmoParser, which implements the descend method:

```
vhtDataNode *vhtCosmoParser::descend(void *someData)
{
  initialNode= NULL;
  m_sgRoot= NULL;
  if (traverser == NULL) {
    traverser= new vhtDFTraverser(this);
```

```
    }
  if ((((csNode *)someData)->isOfType(csTransform::getClassType( ))) {
    m__sgRoot= new vhtComponent( );
    initialNode= new vhtCosmoNode(NULL);
    initialNode->setCosmo((csGroup *)someData);
    initialNode->setHaptic(m__sgRoot);
    traverser->apply((csGroup *)someData);
  }
  return initialNode;
}
```

Optimizer provides a basic depth first traversal class that can be used to traverse Cosmo scene graphs. This has been subclassed to a vhtDFTraverser. The argument to descend is the root node of the Cosmo scene graph (CSG) that is to be parsed.

This code first creates a vhtComponent to match the root node of the CSG, then creates the appropriate neutral node and links it bidirectionally to the HSG and the CSG. Finally, the Optimizer traversal is initiated.

Once the traversal has been started, the DFTraverser calls preNode before each node is visited and postNode after each node is visited. This is a standard in order tree traversal. In the vhtDFTraverser, the preNode method is implemented as:

```
opTravDisp vhtDFTraverser::preNode( csNode *&currNode,
  const opActionInfo &action )
{
  vhtCosmoNode *dataNode;
  opTravDisp rv = opTravCont;
  if (currNode == owner->initialNode->getCosmo( )) return rv;
```

The first step is to construct a new neutral node, and link it to the current cosmo node:

dataNode=new    vhtCosmoNode(owner->currentDataNode);

dataNode->setCosmo(currNode);

Then for each Cosmo node type, the corresponding vhtNode must be constructed and linked to the corresponding neutral node. In this case, Cosmo shapeClass objects are mapped into vhtShape3D objects.

```
bool success = false;
//
// shape 3D
//
if ((currNode->getType( ))->isDerivedFrom(shapeClass)) {
    vhtShape3D *pointNode = createGeometryNode( currNode );
    if( pointNode ) {
      fatherStack.push( pointNode );
      pointNode->setName( currNode->getName( ) );
      // register with NSG
      owner->currentDataNode->addChild(dataNode);
      dataNode->setHaptic(pointNode);
      success = true;
    }
}
```

For transforms, the corresponding VHT nodes are vhtTransformGroup and vhtComponent:

```
    else if(currNode->getType( )->isDerivedFrom(transformClass)) {
      //
      // a transform group node
      //
      vhtTransformGroup *newGroup;
      if (owner->currentDataNode == owner->initialNode) {
        newGroup = createComponent( currNode );
      } else {
        newGroup = createTransformGroup( currNode );
      }
      fatherStack.push( newGroup );
      owner->currentDataNode->addChild(dataNode);
      dataNode->setHaptic(newGroup);
      success = true;
    }
    etc...
```

The associated postNode method simply maintains the stack so that the top is always the current neutral parent node.

To construct a vhtShape3D node, the above code segment uses an associated method createGeometryNode. The geometry extracted from the CSG must be mapped somehow into geometry that will be useful for an associated collision engine to use. However there is no knowledge in this method of the exact geometry format that could be required, so the VHT uses the concept of a geometry template.

A geometry template is a generic description of the geometry that a collision factory can use to construct collider specific geometry from. Geometry templates are stored in specializations of the vhtGeometry class. If all colliders are based on convex hull algorithms, then only the vertices of the geometry are needed, and for this a vhtVertexGeometry object may be used.

In the context of Cosmo, the createGeometryNode method contains the following code:

```
csGeometry *g= shape->getGeometry(i);
// extract all geoSets
if ((g != NULL) && g->getType( )->isDerivedFrom(geoSetClass)) {
  csMFVec3f *coords =
    ((csCoordSet3f *)((csGeoSet *)g)->getCoordSet( ))->point( );
  //
  // copy vertices
  //
```

First copy all the vertices from Cosmo into a vertex list.

```
unsigned int numPoints = coords->getCount( );
if( numPoints > 3 ) {
    vhtVector3d *vertex = new vhtVector3d[numPoints];
    csVec3f currCSVec;
    for(unsigned int i=0; i < numPoints; i++ ) {
      currCSVec = coords->get(i);
      vertex[i] = vhtVector3d( owner->m__scale * currCSVec[0]
        , owner->m__scale * currCSVec[1]
        , owner->m__scale * currCSVec[2] );
    }
```

Build the geometry template from the vertex list.
    vhtVertexGeometry*pointGeom=new    vhtVertexGeometry( );
    pointGeom->setVertices(vertex, numPoints);

Construct the vhtShape3D node and set its properties.

```
    //
    // construct shape node
    //
    pointNode = new vhtShape3D( pointGeom );
    //
    // set dynamic props
    //
    vhtDynamicAttributes *dynamic =
    new vhtDynamicAttributes( );
    pointNode->setPhysicalAttributes( dynamic );
    vhtMassProperties massProp;
    massProp.computeHomogeneousMassProp( pointNode );
    dynamic->setMassProperties( massProp );
    }
}
```

In this case, once a HSG has been built using this parser the constructor for vhtCollisionEngine, or the method vhtCollisionEngine::regenerateDataStructures( ) will add additional geometry nodes to the vhtShape3D class that are specialized for the selected collider.

The node parsing mechanism is the most complex aspect of the model import framework. Once this has been completed the application is nearly ready to go.

Scene Graph Import

To actually use a node parser in an application is very simple. Both example programs in the Demos/Vrml directory on the VirtualHand Suite distribution CD use the Cosmo node parser. The parser is used in the method addVrmlModel:

```
void CosmoView::addVrmlModel( char *filename )
{
    // load the Vrml file
    opGenLoader *loader = new opGenLoader( false, NULL, false );
    csGroup *tmpNode = loader->load( filename );
    delete loader;
    if( tmpNode ) {
        // top node must be a transform for CosmoParser to work
        csTransform *vrmlScene = new csTransform( );
        vrmlScene->addChild( tmpNode );
        // add to scene
        m_sceneRoot->addChild( vrmlScene );
        // set scene center
        csSphereBound sph;
```

```
        ((csNode*) vrmlScene)->getSphereBound(sph);
        m_sceneRoot->setCenter(sph.center);
        // adjust camera
        setCameraFOV( );
        m_camera->draw(m_drawAction);
        //
        // Note that the vrmlScene must be of type
        csTransform* for the parser to work.
        //
        vhtCosmoParser *cosmoParser = new vhtCosmoParser( );
        vhtCosmoNode      *neutralNode     =
(vhtCosmoNode    *)m_engine->registerVisualGraph( vrmlScene,
cosmoParser, true );
    }
}
```

Only the final two lines of this method actually use the Cosmo node parser. The first portion of the method loads a VRML model using the Optimizer loader. The loaded model is added to the Cosmo scene and the scene parameters are adjusted.

Finally, the node parser is constructed and passed into the corresponding vhtEngine for this simulation. The method vhtEngine::registerVisualGraph performs three functions, first it calls the node parser descend method, second calls the vhtSimulation::addSubgraph method. This is useful for performing special simulation processing on the new HSG subgraph. Finally, the engine maintains a list of all vhtComponent nodes in the entire HSG.

Synchronization

After all the above steps have been completed, the HSG and NSG constructed the simulation is ready to run. During the simulation loop, it is necessary to copy the transformation matrices from the HSG into the visual graph to maintain visual consistency. This is the synchronization problem.

The vhtEngine maintains a list of all components in the HSG. In most applications, only the transforms for the components will need to be synchronized with the visual graph since all others can be calculated from them. To optimize this, the engine has a method getComponentUpdaters that provides the component list. The idea is to traverse this list once per frame and copy all the transformations from the HSG into the visual scene graph.

Again the example of Cosmo is used. Once per render loop frame, the method updateHSGData is invoked:

```
void CosmoView::updateHSGData( void )
{
        It is critical in a multithreaded application to ensure that the transforms are
not being updated by the other thread while they are being copied.
        m_engine->getHapticSceneGraph( )->sceneGraphLock( );
Get the component list from the engine.
        // traversal data types
        vhtNodeHolder *nodeList = m_engine->getComponentUpdaters( );
        vhtNodeHolder *nodeCursor = nodeList;
        vhtCosmoNode *currNode = NULL;
        vhtComponent *currComponent = NULL;
        // transformation matrix
        double xform[4][4];
        vhtTransform3D vhtXForm;
        csMatrix4f      cosmoXForm;
        Walk through the component list, getting copying transformation matrix as we
go.
        while( nodeCursor != NULL ) {
                // get next component updater node
                currNode = (vhtCosmoNode *)nodeCusor->getData( );
                currComponent = (vhtComponent *)currNode->getHaptic( );
```

```
        // get latest transform
        vhtXForm = currComponent->getTransform( );
        vhtXForm.getTransform( xform );
    Copy to a cosmo transformation.
        cosmoXForm.setCol(0, xform[0][0], xform[0][1], xform[0][2], xform[0][3] );
        cosmoXForm.setCol(1, xform[1][0], xform[1][1], xform[1][2], xform[1][3] );
        cosmoXForm.setCol(2, xform[2][0], xform[2][1], xform[2][2], xform[2][3] );
        cosmoXForm.setCol(3, xform[3][0], xform[3][1], xform[3][2], xform[3][3] );
        // set the corresponding cosmo node
        ((csTransform *)currNode->getCosmo( ))->setMatrix(cosmoXForm);
        // next list item
        nodeCursor = nodeCursor->getNext( );
    }
    // unset mutex
    m_engine->getHapticSceneGraph( )->sceneGraphUnlock( );
}
```

The neutral node architecture provides the node container class vhtNodeHolder as a simple way of constructing and traversing lists of vhtDataNode objects.

Additional Description

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

All publications and patent applications cited in this specification are herein incorporated by reference as if each individual publication or patent application were specifically and individually indicated to be incorporated by reference.

We claim:

1. A method for simulating interaction with graphical objects, the method comprising:

within a computing device comprising one or more processors, a memory, and one or more clocks, wherein the computing device is configured to transmit signals from the one or more processors to the memory, sending one or more signals from the processor to the memory to configure the memory to store a representation of a first scene graph comprising a representation of a plurality of nodes and of one or more interconnections between one or more of the plurality of nodes;

sending one or more signals from the one or more processors to the memory to configure the memory to store a representation of a second scene graph comprising a representation of a plurality of nodes and of one or more interconnections between one or more of the plurality of nodes;

sending one or more signals from the one or more processors to the memory to configure the memory to store a representation of a neutral scene graph, comprising a representation of a plurality of associations between each node from the plurality of nodes of the first scene graph and a node from the plurality of nodes of the second scene graph, wherein each association is independent of any interconnections of the first scene graph and any interconnections of the second scene graph, and any sending one or more signals from the one or more processors to the memory to configure the memory to update the representation of the first scene graph at a first update rate timed by one of the one or more clocks; and sending one or more signals from the one or more processors to the memory to configure the memory to update the representation of the second scene graph at a second update rate timed by one of the one or more clocks, the second update rate being substantially higher than the first update rate.

2. The method of claim 1, wherein the neutral scene graph provides a topology transformation between the first scene graph and the second scene graph.

3. The method of claim 1, wherein the first scene graph and the second scene graph are asynchronous, further comprising the step of synchronizing the representation of the first scene graph and the representation of the second scene graph.

4. The method of claim 1, wherein the first scene graph is a graphical scene graph, and the second scene graph is a haptic scene graph.

5. The method of claim 1, wherein the first update rate is between about 10-60 Hz; and wherein the second update rate is between about 1000-2000 Hz.

6. A method for simulating interaction with graphical objects, the method comprising:

within a computing device comprising one or more processors, a memory, and one or more clocks, wherein the computing device is configured to transmit signals from the one or more processors to the memory, sending one or more signals from the processor to the memory to configure the memory to store a representation of a first scene graph comprising a representation of a plurality of nodes and one or more interconnections between the plurality of nodes;

sending one or more signals from the one or more processors to the memory to configure the memory to store a representation of a second scene graph comprising a representation of a plurality of nodes and of one or more interconnections between one or more of the plurality of nodes;

sending one or more signals from the one or more processors to the memory to configure the memory to store a representation of a first neutral scene graph, comprising a representation of a plurality of associations between each node from the plurality of nodes of the first scene graph and a node from the plurality of nodes of the second scene graph, wherein each association is independent of any interconnections of the first scene graph and any interconnections of the second scene graph;

sending one or more signals from the one or more processors to the memory to configure the memory to store a representation of a third scene graph comprising a representation of a plurality of nodes and of one or more interconnections between one or more of the plurality of nodes; and sending one or more signals from the one or more processors to the memory to configure the memory to store a representation of a second neutral scene graph, comprising a representation of a plurality of associations between each node from the plurality of nodes of the first scene graph and a node from the plurality of nodes of the third scene graph, wherein each association is independent of any interconnections of the first scene graph and any interconnections of the third scene graph.

7. A method for simulating interaction with graphical objects, the method comprising:

within a computing device comprising one or more processors, a haptic device, and a memory, wherein the computing device is configured to transmit signals from the haptic device to the one or more processors, and to transmit signals from the one or more processors to the memory, sending one or more signals from the haptic device to the one or more processors, wherein the one or more signals represent geometric information about a plurality of real-world objects;

sending one or more signals from the one or more processors to the memory to configure the memory to store one or more data structures comprising a plurality of virtual representations, each virtual representation uniquely associated with a real-world object from the plurality of real-world objects, and each virtual representation comprising geometric information associated with the real world object;

determining if at least one contact state exists between a first virtual representation from the plurality of virtual representations and a second virtual representation from the plurality of virtual representations;

if at least one contact state exists, determining if the at least one contact state meets a predetermined threshold number of required contact states between the first virtual representation and the second virtual representation, each of the at least one contact states being associated with a corresponding portion of the first virtual representation and a portion of the second virtual representation;

if the at least one contact state meets a predetermined threshold number of contact states, determining if a minimum drop angle parameter is exceeded for each portion of the first virtual representation associated with the at least one contact state;

if the minimum drop angle parameter is exceeded, sending a signal to indicate a grasp state associated with the second virtual representation; and if the minimum drop angle parameter is not exceeded, sending a signal to indicate a release state associated with the second virtual representation.

8. The method of claim 7, wherein the first virtual representation is a virtual representation of a hand and each portion of the virtual representation of the hand that is associated with a contact state being a virtual representation of a finger of the hand.

9. The method of claim 7, further comprising:

analyzing a relationship between the first virtual representation and the second virtual representation;

determining, at least partially based on the analyzed relationship, a local surface approximation associated with each portion of the first virtual representation associated with the at least one contact state and each portion of the first virtual representation within a predetermined distance from the second virtual representation; and storing each local surface approximation in memory.

10. The method of claim 7, further comprising:

analyzing a relationship between the first virtual representation and the second virtual representation;

determining, at least partially based on the analyzed relationship, a local surface approximation associated with each portion of the first virtual representation associated with the at least one contact state and each portion of the first virtual representation within a predetermined distance from the second virtual representation;

storing each local surface approximation in memory; and sending a signal configured to cause a haptic effect in the haptic device at least partially based on at least one local surface approximation stored in memory, the haptic effect being configured to output a sensation at least partially based on the at least one contact state.

11. An apparatus for simulating interaction with graphical objects, the apparatus comprising:

a computing device comprising one or more processors, one or more data storage devices, and one or more clocks, wherein the computing device is configured to transmit signals from the one or more processors to the memory;

means for sending one or more signals from the processor to the one or more data storage devices to configure the one or more data storage devices to store a representation of a first scene graph comprising a representation of a plurality of nodes and of one or more interconnections between one or more of the plurality of nodes;

means for sending one or more signals from the one or more processors to the one or more data storage devices to configure the one or more data storage devices to store a representation of a second scene graph comprising a representation of a plurality of nodes and of one or more interconnections between one or more of the plurality of nodes;

means for sending one or more signals from the one or more processors to the one or more data storage devices to configure the one or more data storage devices to store a representation of a neutral scene graph comprising a representation of a plurality of associations between each node from the plurality of nodes of the first scene graph and a node from the plurality of nodes of the second scene graph, wherein each association is independent of any interconnections of the first scene graph and any interconnections of the second scene graph;

means for sending one or more signals from the one or more processors to the one or more data storage devices to configure the one or more data storage devices to update the representation of the first scene graph at a first update rate timed by one of the one or more clocks; and means for sending one or more signals from the one or more processors to the one or more data storage devices to configure the one or more data storage devices to update the representation of the second scene graph at a second update rate timed by one of the one or more clocks, the second update rate being substantially higher than the first update rate.

12. The apparatus of claim 11, wherein the neutral scene graph is configured to provide a topology transformation between the first scene graph and the second scene graph.

13. The apparatus of claim 11, further comprising means for synchronizing the representation of the first scene graph and the representation of the second scene graph if the first scene graph and the second scene graph are asynchronous.

14. The apparatus of claim 11, wherein the first scene graph is configured to be a graphical scene graph representing geometric information comprising a representation of one or more images on a graphical display system, and the second scene graph is configured to be a haptic scene graph comprising a representation of geometric information regarding the environment of a haptic device.

15. The apparatus of claim 11:
   means for wherein the first update rate is between about 10-60 Hz; and
   means for wherein the second update rate is between about 1000-2000 Hz.

16. An apparatus for simulating interaction with graphical objects, the apparatus comprising:
   a computing device comprising one or more processors, one or more data storage devices, and one or more clocks, wherein the computing device is configured to transmit signals from the one or more processors to the memory;
   means for sending one or more signals from the processor to the one or more data storage devices to configure the one or more data storage devices to store a representation of a first scene graph comprising a representation of a plurality of nodes and of one or more interconnections between one or more of the plurality of nodes;
   means for sending one or more signals from the one or more processors to the one or more data storage devices to configure the one or more data storage devices to store a representation of a second scene graph comprising a representation of a plurality of nodes and of one or more interconnections between one or more of the plurality of nodes;
   means for sending one or more signals from the one or more processors to the one or more data storage devices to configure the one or more data storage devices to store a representation of a first neutral scene graph comprising a representation of a plurality of associations between each node from the plurality of nodes of the first scene graph and a node from the plurality of nodes of the second scene graph, wherein each association is independent of any interconnections of the first scene graph and any interconnections of the second scene graph;
   means for sending one or more signals from the one or more processors to the one or more data storage devices to configure the one or more data storage devices to store a representation of a third scene graph comprising a representation of a plurality of nodes and of one or more interconnections between one or more of the plurality of nodes;
   means for sending one or more signals from the one or more processors to the one or more data storage devices to configure the one or more data storage devices to store a representation of a second neutral scene graph, comprising a representation of a plurality of associations between each node from the plurality of nodes of the first scene graph and a node from the plurality of nodes of the third scene graph, wherein each association is independent of any interconnections of the first scene graph and any interconnections of the third scene graph.

17. An apparatus for simulating interaction with graphical objects, the apparatus comprising:
   one or more data storage devices;
   means for uniquely associating a plurality of real-world objects with a plurality of virtual representations stored in the one or more data storage devices, each virtual representation from the plurality of virtual representations being a representation of its associated real-world object from the plurality of real-world objects;
   means for determining if at least one contact state exists between a first virtual representation from the plurality of virtual representations and a second virtual representation from the plurality of virtual representations;
   means for, if at least one contact state exists, determining if the at least one contact state meets a predetermined threshold number of required contact states between the first virtual representation and the second virtual representation, each of the at least one contact states being associated with a corresponding portion of the first virtual representation and a portion of the second virtual representation;
   means for, if the at least one contact state meets a predetermined threshold number of contact states, determining if a minimum drop angle parameter is exceeded for each portion of the first virtual representation associated with the at least one contact state;
   means for, if the minimum drop angle parameter is exceeded, sending a signal to indicate a grasp state associated with the second virtual representation; and
   means for, if the minimum drop angle parameter is not exceeded, sending a signal to indicate a release state associated with the second virtual representation.

18. The apparatus of claim 17, wherein the first virtual representation is configured to be a virtual representation of a hand and each portion of the virtual representation of the hand that is associated with a contact state, itself configured to be a virtual representation of a finger of the hand.

19. The apparatus of claim 17, further comprising:
   means for analyzing a relationship between the first virtual representation and the second virtual representation;
   means for determining, at least partially based on the analyzed relationship, a local surface approximation associated with each portion of the first virtual representation associated with the at least one contact state and each portion of the first virtual representation within a predetermined distance from the second virtual representation; and
   means for storing each local surface approximation in the one or more data storage devices.

20. The apparatus of claim 17, further comprising:
   means for analyzing a relationship between the first virtual representation and the second virtual representation;
   means for determining, at least partially based on the analyzed relationship, a local surface approximation associated with each portion of the first virtual representation associated with the at least one contact state and each portion of the first virtual representation within a predetermined distance from the second virtual representation;
   means for storing each local surface approximation in the one or more data storage devices; and
   means for sending a signal configured to cause a haptic effect at least partially based on at least one local surface approximation stored in the one or more data storage devices, the haptic effect being configured to output a sensation at least partially based on the at least one contact state.

* * * * *

UNITED STATES PATENT AND TRADEMARK OFFICE
CERTIFICATE OF CORRECTION

PATENT NO. : 7,676,356 B2  Page 1 of 1
APPLICATION NO. : 11/264743
DATED : March 9, 2010
INVENTOR(S) : Ron Carmel et al.

It is certified that error appears in the above-identified patent and that said Letters Patent is hereby corrected as shown below:

Page 3, Column 2, (Other Publications), line 58, please delete "Maptic", please insert -- Haptic --.

In the Specification:
Column 7, line 18, please delete "electromechanical", please insert -- electro-mechanical --.

Column 11, line 48, after "running on the same machine as", please delete "5".

Column 36, line 52 approx., please delete "preprocess", please insert -- preProcess --.

In the Claims
Column 46, line 55, claim 20 please delete "surface", please insert -- service --.

Column 46, line 58, claim 20 please delete "surface", please insert -- service --.

Signed and Sealed this

Fourteenth Day of September, 2010

David J. Kappos
*Director of the United States Patent and Trademark Office*